(12) United States Patent
Cho

(10) Patent No.: US 11,260,840 B2
(45) Date of Patent: Mar. 1, 2022

(54) INTEGRATED CONTROL SYSTEM FOR VEHICLE

(71) Applicants: Hyundai Motor Company, Seoul (KR); Kia Motors Corporation, Seoul (KR)

(72) Inventor: Wan Ki Cho, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 200 days.

(21) Appl. No.: 16/254,013

(22) Filed: Jan. 22, 2019

(65) Prior Publication Data

US 2020/0130660 A1  Apr. 30, 2020

(30) Foreign Application Priority Data

Oct. 29, 2018 (KR) .......................... 10-2018-0129497

(51) Int. Cl.
  *B60T 8/1763*  (2006.01)
  *B60W 40/068*  (2012.01)
  (Continued)

(52) U.S. Cl.
  CPC ........ *B60T 8/1763* (2013.01); *B60T 8/17552* (2013.01); *B60W 10/18* (2013.01);
  (Continued)

(58) Field of Classification Search
  CPC ...... B60T 8/17552; B60T 8/1755; B60T 8/26; B60W 10/18; B60W 10/20; B60W 30/02;
  (Continued)

(56) References Cited

U.S. PATENT DOCUMENTS 5,089,967 A    2/1992  Haseda et al.
5,433,514 A *  7/1995  Tsukamoto ............. B60T 8/175
                                                      303/113.2
(Continued)

FOREIGN PATENT DOCUMENTS

CN         1890147 A  *  1/2007  ........... B62D 15/025
CN       105270409 A     1/2016
(Continued)

OTHER PUBLICATIONS https://en.wikipedia.org/w/index.php?title=Threshold_braking&oldid=794264309 (Year: 2017).*
(Continued)

*Primary Examiner* — Hunter B Lonsberry
*Assistant Examiner* — Jay Khandpur
(74) *Attorney, Agent, or Firm* — Mintz Levin Cohn Ferris Glovsky and Popeo, P.C.; Peter F. Corless

(57) ABSTRACT

An integrated control system for a vehicle is provided. The system includes a friction coefficient calculation unit that calculates friction coefficients of left side and right side road surfaces, respectively, based on vehicle wheel state information and a predetermined setting information collected during ABS operation. A feedforward braking pressure calculation unit calculates a feedforward braking pressure of each vehicle wheel using the friction coefficients. An ABS braking pressure calculation unit calculates an ABS braking pressure of the each vehicle wheel based on the feedforward braking pressure and slip rate information. A rear wheel steering control amount calculation unit calculates a rear wheel steering control amount for yaw compensation using the ABS braking pressure of each vehicle wheel and a rear wheel steering controller executes a rear wheel steering control according to the rear wheel steering control amount.

17 Claims, 8 Drawing Sheets

(51) Int. Cl.
  *B60T 8/1755* (2006.01)
  *B60W 10/20* (2006.01)
  *B60W 30/02* (2012.01)
  *B60W 10/18* (2012.01)
  *B62D 6/00* (2006.01)
  *B60W 40/114* (2012.01)
  *B60T 8/26* (2006.01)
  *B60W 40/10* (2012.01)

(52) U.S. Cl.
  CPC ............ *B60W 10/20* (2013.01); *B60W 30/02* (2013.01); *B60W 40/068* (2013.01); *B62D 6/003* (2013.01); *B60T 8/1755* (2013.01); *B60T 8/26* (2013.01); *B60W 40/10* (2013.01); *B60W 40/114* (2013.01); *B60W 2520/14* (2013.01); *B60W 2520/20* (2013.01); *B60W 2520/26* (2013.01); *B60W 2720/14* (2013.01); *B60W 2720/26* (2013.01)

(58) Field of Classification Search
  CPC .. B60W 40/068; B60W 40/10; B60W 40/114; B60W 2520/14; B60W 2520/26; B60W 2720/14; B60W 2720/26; B62D 6/003
  See application file for complete search history.

(56) References Cited

U.S. PATENT DOCUMENTS

| | | | |
|---|---|---|---|
| 10,093,321 B1 * | 10/2018 | Berntorp | ................ B60T 8/172 |
| 2003/0028308 A1 | 2/2003 | Ishikawa et al. | |
| 2013/0245909 A1 * | 9/2013 | Hirose | ................ B60T 8/1764 |
| | | | 701/73 |
| 2020/0023852 A1 * | 1/2020 | Yi | ................ B60W 40/10 |

FOREIGN PATENT DOCUMENTS

| | | | |
|---|---|---|---|
| CN | 107512262 A | * | 12/2017 |
| JP | H0478644 A | | 3/1992 |
| WO | WO-9919192 A1 * | 4/1999 | ............ B60T 8/1755 |

OTHER PUBLICATIONS https://en.wikipedia.org/w/index.php?title=Anti-lock_braking_system&oldid=814564735 (Year: 2017).*

Dugoff, H., P.S. Francher, and L. Segel (1969): "Tire performance characteristics affecting vehicle response to steering and braking control inputs, final report." Technical Report. Highway Safety Research Institute, Ann Arbor, Michigan.

IEEE Transactions On Vehicular Technology, vol. 59, No. 2, Feb. 2010.

* cited by examiner

INTEGRATED CONTROL SYSTEM FOR VEHICLE

CROSS-REFERENCE TO RELATED APPLICATION

This application claims under 35 U.S.C. § 119(a) the benefit of priority to Korean Patent Application No. 10-2018-0129497 filed on Oct. 29, 2018, the entire contents of which are incorporated herein by reference.

BACKGROUND

(a) Technical Field

The present disclosure relates to an integrated control system for a vehicle, and more particularly, to an integrated control system for a vehicle, which performs stable anti-lock braking system (ABS) operation and braking force generation of a vehicle even in a braking situation where the left and right side friction coefficients (u) of a road surface are different from each other, thus securing stable braking performance and controlling the behavior of the vehicle.

(b) Background Art

Generally, a vehicle is mounted with chassis control systems such as an Active Front Steering (AFS) system, a Rear Wheel Steering (RWS) system, and an Electronic Stability Control (ESC) system to control the behavior of the vehicle. Among them, the AFS system is a front wheel steering system that may stabilize the behavior of the vehicle by varying a steering gear ratio for each vehicle speed, such as a high speed and a low speed, and generates a lateral force on the front wheels of the vehicle.

In addition, the RWS system is a rear wheel steering system that generates a lateral force on the rear wheel of the vehicle and determines the traveling direction of the rear wheel, and reduces the rotation radius of the vehicle upon low-speed cornering through a reverse phase control of the rear wheel steering direction (relative to the front wheel steering direction) in a large vehicle, thus improving the maneuverability of the vehicle.

Further, the RWS system reduces a yaw-rate, a side-slip, etc. upon high-speed corning through the in-phase control of the rear wheel steering direction (relative to the front wheel steering direction), thus improving the traveling stability of the vehicle. The ESC system generates a longitudinal force of a tire and monitors the posture of the vehicle in real time while the vehicle is being driven to adjust a driving force or a braking force (a braking pressure) when a dangerous situation occurs, thus stably maintaining the posture of the vehicle.

In recent years, an integrated control system for integrally controlling chassis control systems has been under development to maximize the traveling performance of the vehicle. In addition, an electronic control system for improving the stability during traveling of the vehicle includes an anti-lock brake system (hereinafter, referred to as 'ABS') for preventing a wheel slip upon braking of the vehicle, a traction control system (hereinafter, referred to as 'TCS') configured to operate an engine and a brake upon rapid acceleration to prevent a wheel slip, etc. Recent ESC systems integrally operate the ABS and TCS systems, thus stably maintaining the posture of the vehicle in emergency situations.

Meanwhile, after determining a slip rate of the left and right side wheels relative to the road surface, that is, a slip rate of the left and right side wheels of the vehicle from the information collected through sensors, etc. within the vehicle, the ABS control, etc. are performed based on the determined slip rate of the left and right side wheels. However, in the conventional ABS control, since a control is performed based on insufficient information, as illustrated in FIG. 1, an excessive chattering phenomenon occurs in the braking force, and the braking performance is thereby limited.

As illustrated in FIG. 2, in a split braking situation where the friction coefficients (u) of the left and right side road surfaces are different from each other, the ABS operates on the wheel of the low friction road surface, and in this time, an unnecessary yaw behavior occurs in the vehicle due to a difference between the left and right braking forces. Therefore, on the high friction road surface, as illustrated in FIG. 3, a control for reducing the wheel braking amount (a braking force and a braking pressure) for yaw stabilization is performed, but this causes deterioration of braking performance.

The above information disclosed in this section is merely for enhancement of understanding of the background of the disclosure and accordingly it can contain information that does not form the prior art that is already known in this country to a person of ordinary skill in the art.

SUMMARY

Accordingly, the present disclosure provides an integrated control system for a vehicle, which may perform a more stable ABS operation and braking force generation of a vehicle even in a braking situation where the left and right side friction coefficients (u) of a road surface are different from each other, thus securing a more stable braking performance and controlling the behavior of the vehicle.

In order to achieve the object, according to one aspect of the present disclosure, an integrated control system for a vehicle may include a friction coefficient calculation unit configured to calculate a friction coefficient of a left side road surface and a friction coefficient of a right side road surface, respectively, on which a left side wheel and a right side wheel are grounded in a road surface of a road on which the vehicle is being driven based on vehicle wheel state information and predetermined setting information collected from a vehicle upon anti-lock brake system (ABS) operation while the vehicle is being driven; a feedforward braking pressure calculation unit configured to calculate a feedforward braking pressure of each vehicle wheel using the friction coefficients of the left side road surface and the right side road surface calculated by the friction coefficient calculation unit; an ABS braking pressure calculation unit configured to calculate an ABS braking pressure of the each vehicle wheel based on the feedforward braking pressure and information of the vehicle wheel calculated by the feedforward braking pressure calculation unit; a rear wheel steering control amount calculation unit configured to calculate a rear wheel steering control amount for yaw compensation using the ABS braking pressure of each vehicle wheel calculated by the ABS braking pressure calculation unit; and a rear wheel steering controller configured to perform a rear wheel steering control of the vehicle based on the rear wheel steering control amount calculated by the rear wheel steering control amount calculation unit.

As a result, according to the integrated control system for the vehicle according to the present disclosure, it may be possible to perform a more stable ABS operation and braking force generation of a vehicle even in a braking situation where the left and right side friction coefficients (μ) of a road surface are different from each other, thus securing a more stable braking performance and controlling the behavior of the vehicle.

BRIEF DESCRIPTION OF THE DRAWINGS

The above and other features of the present disclosure will now be described in detail with reference to exemplary embodiments thereof is illustrated the accompanying drawings which are given herein below by way of illustration only, and thus are not limitative of the present disclosure, and wherein.

Figure 1:
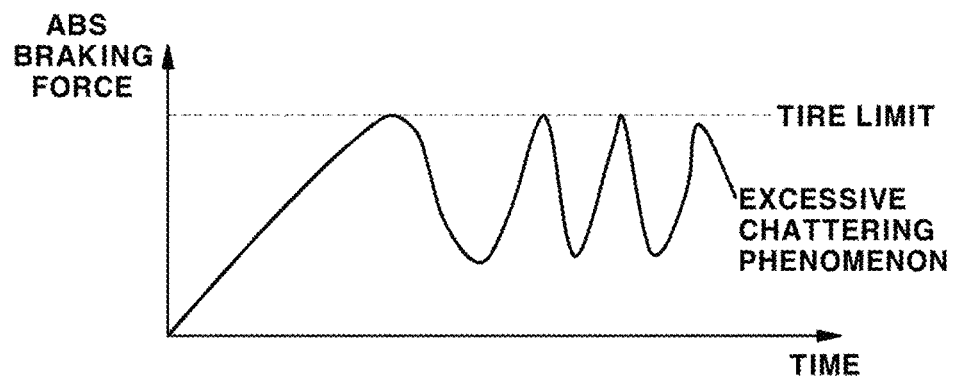
FIG. 1 is a diagram illustrating a problem of an ABS operation according to the prior art.
Figure 2:
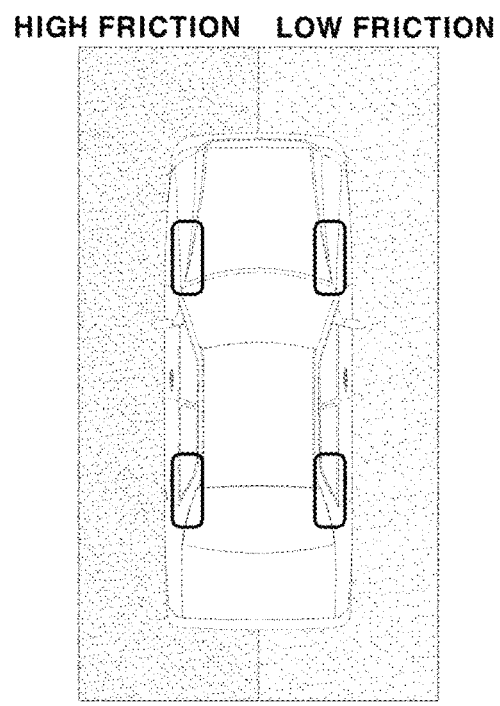
FIG. 2 is a diagram embodying a road surface state according to the prior art.
Figure 3:
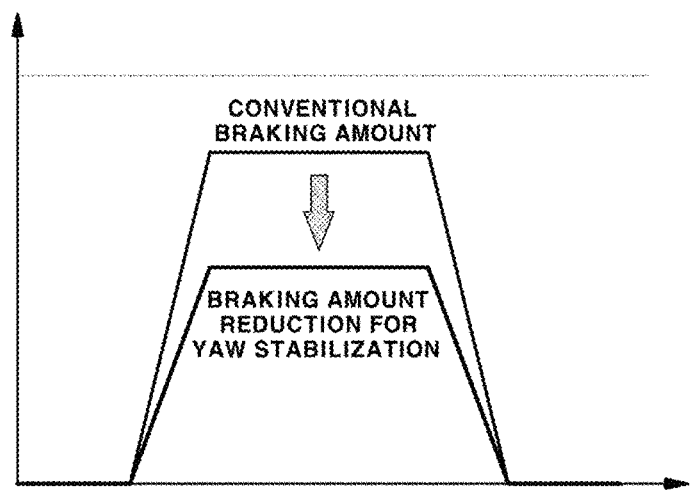
FIG. 3 is a diagram illustrating an example of a yaw stabilization control according to the prior art.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment. In the figures, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although the exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings so that those skilled in the art at which the present disclosure pertains can easily carry out the present disclosure. However, the present disclosure is not limited to an exemplary embodiments described herein but can be also embodied in other forms.

The present disclosure is to provide an integrated control system for a vehicle, which may perform a more stable ABS operation and braking force generation of a vehicle even in a split braking situation where the left side and right side friction coefficients (u) of a road surface on which the left side wheel and right side wheel of a vehicle are grounded in a road when the vehicle is being driven are different from each other thus securing stable braking performance and controlling the behavior of the vehicle.

For this purpose, the present disclosure independently estimates the friction coefficients of a left side road surface and a right side road surface on which the left and right side wheels of a vehicle are grounded, and performs a cooperation control of Anti-Lock Brake System (ABS) and Rear Wheel Steering (RWS) system based on the estimated value, thus preventing the occurrence of a yaw behavior of the vehicle due to a difference between the left and right braking forces, and securing excellent braking performance and behavior stability of the vehicle.

Figure 4:
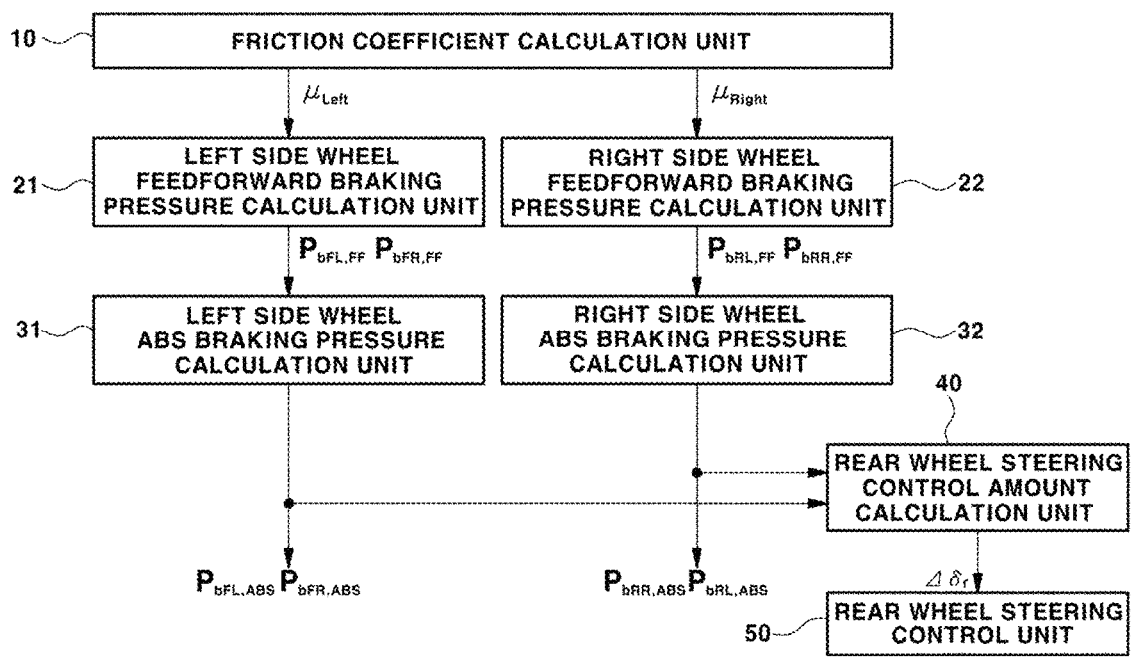
FIG. 4 is a block diagram illustrating a configuration of an integrated control system for a vehicle according to an exemplary embodiment of the present disclosure.

FIG. 4 is a block diagram illustrating a configuration of an integrated control system of a vehicle according to an exemplary embodiment of the present disclosure, and as illustrated, the integrated control system may include a friction coefficient calculation unit 10, feedforward (FF) braking pressure calculation units 21, 22, ABS braking pressure calculation units 31, 32, a rear wheel steering control amount calculation unit 40, and a rear wheel steering controller 50. An overall controller may be configured to operate all the units of the integrated control system.

As described above, the present disclosure cooperatively operates the ABS and RWS system to ensure sufficient braking performance and braking distance of the vehicle, and stable vehicle behavior, and when the ABS is operated by the driver engaging a brake pedal, the friction coefficient calculation unit 10 may be configured to independently estimate the friction coefficients (Ken, Might) of the left side road surface and the right side road surface on which the left side wheels and the right side wheels are grounded in a road surface based on the information collected in the vehicle, respectively.

The present disclosure divides the wheel of the vehicle into left side wheels (i.e., left wheels) (FL, RL) and right side wheels (i.e., right wheels) (FR, RR), and divides the road surface on which the left side wheels and the right side wheels of the vehicle are grounded in a road surface into a left side road surface and a right side road surface, respectively. In addition, the present disclosure divides the friction coefficient of the road surface into a friction coefficient ($\mu_{Left}$) of the left side road surface on which the left side wheels of the vehicle is grounded and a friction coefficient ($\mu_{Right}$) of the right side road surface on which the right side wheels of the vehicle is grounded.

Further, the feedforward braking pressure calculation units 21, 22 may be configured to calculate feedforward braking pressures ($P_{bFL\_FF}$, $P_{bFR\_FF}$, $P_{bRL\_FF}$, $P_{bRR\_FF}$) of the left side wheels (FL, RL) and the right side wheels (FR, RR) using the values of the respective friction coefficients ($\mu_{Left}$, $\mu_{Right}$) of the left side and right side road surfaces calculated, estimated, and input by the friction coefficient calculation unit 10.

In an exemplary embodiment of the present disclosure, the feedforward braking pressure calculation units 21, 22 may include, as illustrated in FIG. 4, the left side wheel feedforward braking pressure calculation unit 21 configured to calculate the feedforward braking pressures ($P_{bFL\_FF}$, $P_{bRL\_FF}$) for the left side wheels (FL, RL), and the right side wheel feedforward braking pressure calculation unit 22 configured to calculate the feedforward braking pressures ($P_{bFR\_FF}$, $P_{bRR\_FF}$) for the right side wheels (FR, RR).

Further, the ABS braking pressure calculation units 31, 32 may be configured to calculate final ABS braking pressures ($P_{bFL\_ABS}$, $P_{bFR\_ABS}$, $P_{bRL\_ABS}$, $P_{bRR\_ABS}$) of the left side wheels (FL, RL), and the right side wheels (FR, RR) from the feedforward braking pressures ($P_{bFL\_FF}$, $P_{bFR\_FF}$, $P_{bRL\_FF}$, $P_{bRR\_FF}$) calculated, estimated, and input by the feedforward braking pressure calculation unit 21 based on a slip rate of the wheel calculated for each wheel.

In an exemplary embodiment of the present disclosure, the ABS braking pressure calculation units 31, 32 may also include, as illustrated in FIG. 4, the left side wheel ABS braking pressure calculation unit 31 configured to calculate ABS braking pressures ($P_{bFL\_ABS}$, $P_{bRL\_ABS}$) for the left side wheels (FL, RL), and the right side wheel ABS braking pressure calculation unit 32 configured to calculate the ABS braking pressures ($P_{bFR\_ABS}$, $P_{bRR\_ABS}$) for the right side wheels (FR, RR).

The present disclosure more specifically divides the left side wheels (FL, RL) and the right side wheels (FR, RR) of the vehicle for the feedforward braking pressure and the ABS braking pressure, respectively and further divides the left side wheels (FL, RL) and the right side wheels (FR, RR) into front side wheels (i.e., front wheels) (FR, FL) and rear side wheels (i.e., rear wheels) (RR, RL), respectively. In other words, as the feedforward braking pressure and the ABS braking pressure for the left side wheels (FL, RL), the feedforward braking pressure ($P_{bFL\_FF}$) and the ABS braking pressure ($P_{bFL\_ABS}$) for the front side wheel (FL), and the feedforward braking pressure ($P_{bRL\_FF}$) and the ABS braking pressure ($P_{bRL\_ABS}$) for the rear side wheel (RL) are obtained.

In addition, as the feedforward braking pressure and the ABS braking pressure for the right side wheels (FR, RR), the feedforward braking pressure ($P_{bFR\_FF}$) and the ABS braking pressure ($P_{bFR\_ABS}$) for the front side wheel (FR), and the feedforward braking pressure ($P_{bRR\_FF}$) and the ABS braking pressure ($P_{bRR\_ABS}$) for the rear side wheel (RR) are obtained. Further, the rear wheel steering control amount calculation unit 40 may be configured to calculate a rear wheel steering control amount (i.e., a RWS control amount, $\Delta\delta_r = \Delta\delta_{RWS}$) based on the ABS braking pressures ($P_{bFL\_ABS}$, $P_{bFR\_ABS}$, $P_{bRL\_ABS}$, $P_{bRR\_ABS}$) calculated, estimated, and input by the ABS braking pressure calculation units 31, 32 to compensate the yaw behavior of the vehicle in the split braking situation ($\mu_{Left} \neq \mu_{Right}$) where the friction coefficient ($\mu_{Left}$) of left side road surface and the friction coefficient ($\mu_{Right}$) of the right side road surface are different.

In the conventional ABS control logic, a control is performed based only on the slip rate of the wheel, and thus, an excessive chattering phenomenon of the braking force occurs, causing deterioration of the braking performance. However, in the present disclosure, the feedforward braking pressure calculation units 21, 22 may be configured to determine the feedforward braking pressures ($P_{bFL\_FF}$, $P_{bFR\_FF}$, $P_{bRL\_FF}$, $P_{bRR\_FF}$), which is a limit braking pressure of each wheel, and add or subtract the braking pressure according to the slip rate of the corresponding wheel based on the feedforward braking pressure of each wheel, thus improving the braking force chattering phenomenon of the prior art.

In addition, during the split-$\mu$ braking, the friction coefficients between the left and right side road surfaces on which the left side wheels and the right side wheels are grounded are different, and the braking pressure of a high friction surface has typically been reduced to prevent a change in the yaw behavior of the vehicle due to the difference in braking pressure between the left and right side wheels. However, the present disclosure may perform the yaw compensation of the vehicle additionally using the RWS system instead of reducing the braking pressure of the high friction surface, thus solving the deterioration of the braking performance due to the conventional braking pressure reduction control, and securing excellent braking performance of the vehicle and a stable behavior of the vehicle.

Figure 5:
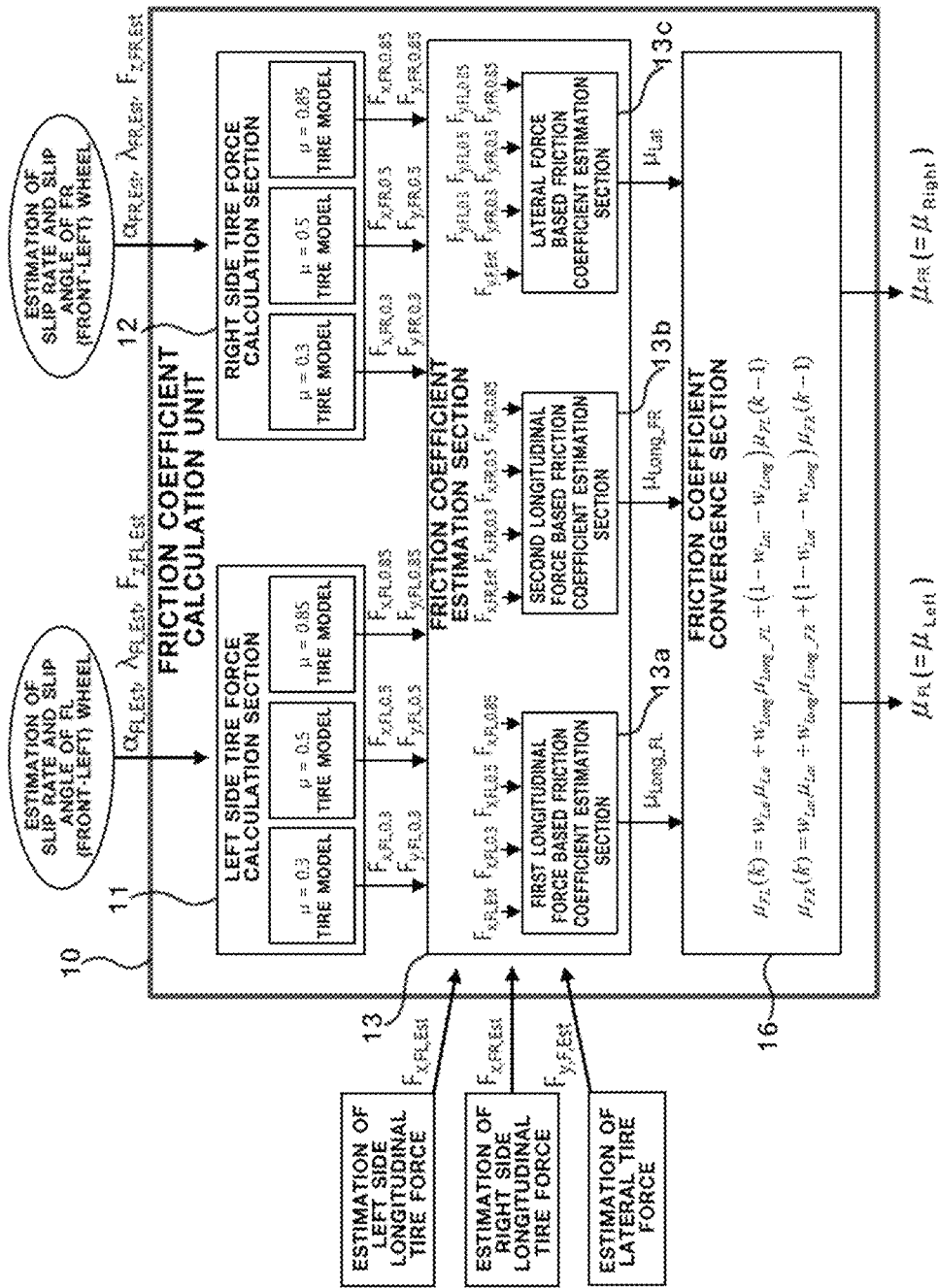
FIG. 5 is a block diagram illustrating a configuration of a friction coefficient calculation unit in the integrated control system for the vehicle according to an exemplary embodiment of the present disclosure.

Meanwhile, FIG. 5 is a block diagram illustrating a configuration of the friction coefficient calculation unit 10 in the integrated control system for the vehicle according to an exemplary embodiment of the present disclosure. As illustrated, the friction coefficient calculation unit 10 may include tire force calculation sections 11, 12, a friction coefficient estimation section 13, and a friction coefficient convergence section 16.

The friction coefficient calculation unit 10 may be configured to finally calculate the friction coefficient ($\mu_{Left}$) of the left side road surface and the friction coefficient ($\mu_{Right}$) of the right side road surface based on the real time information acquired and collected through a sensor, etc. based on a predetermined one wheel among the front side wheels (FL, FR) and the rear side wheels (RL, RR), and FIG. 5 illustrates a configuration of an exemplary embodiment in which the friction coefficients ($\mu_{Left}$, $\mu_{Right}$) of the left side road surface and the right side road surface are obtained based on the front side wheels (FL, FR).

In other words, the friction coefficient calculation unit 10 may be configured to independently calculate and estimate the friction coefficient ($\mu_{Left}$) of the left side road surface and the friction coefficient ($\mu_{Right}$) of the right side road surface, respectively using the state information of the left side wheel (FL) and the right side wheel (FR) of the front side wheels acquired and collected through a sensor, etc. and a pre-stored setting information.

FIG. 5 denotes the friction coefficient of the left side road surface and the friction coefficient of the right side road surface as ($\mu_{FL}$ and $\mu_{FR}$) instead of ($\mu_{Left}$ and $\mu_{Right}$), respectively. First, the tire force calculation sections 11, 12 of the friction coefficient calculation unit 10 may include the left side tire force calculation section 11 configured to calculate a tire force of the left side wheel (FL) for each road surface friction coefficient, and the right side tire force calculation section 12 configured to calculate a tire force of the right side wheel (FR) for each road surface friction coefficient using a tire model for each the road surface friction coefficient, which is predetermined information, to thus calculate the friction coefficient ($\mu_{FL}$) of the left side road surface and the friction coefficient ($\mu_{FR}$) of the right side road surface separately based on the front side wheels (FL, FR).

Herein, the tire force of the left side wheel (FL) and the tire force of the right side wheel (FR) for each road surface friction coefficient include a longitudinal tire force and a lateral tire force of the corresponding wheel, respectively, and as will be described later, a model for each road surface friction coefficient is used, such that the longitudinal tire force and the lateral tire force are also obtained for each road surface friction coefficient.

Additionally, the left side tire force calculation section 11 and the right side tire force calculation section 12 of the friction coefficient calculation unit 10 may be configured to calculate current slip angles ($\alpha_{FL,Est}$, $\alpha_{FR,Est}$), current slip rates ($\lambda_{FL,Est}$, $\lambda_{FR,Est}$), and current normal forces ($F_{z,FL,Est}$, $F_{z,FR,Est}$) of the corresponding tires, that is, the tires (the left side tires) of the left side wheel (FL) and the tires (the right side tires) of the right side wheel (FR), respectively.

More specifically, the left side tire force calculation section 11 may be configured to receive the slip angle ($\alpha_{FL,Est}$), the slip rate ($\lambda_{FL,Est}$), and the normal force ($F_{z,FL,Est}$) of the left side wheel (tire) (FL) as an input, and the right side tire force calculation section 12 may be configured to receive the slip angle ($\alpha_{FR,Est}$), the slip rate ($\lambda_{FR,Est}$), and the normal force ($F_{z,FR,Est}$) of the right side wheel (FR) as an input. Further, the left side tire force calculation section 11 and the right side tire force calculation section 12 may be provided with the tire model for each road surface friction coefficient determined as described above.

FIG. 5 illustrates an example in which $\mu=0.3$, $\mu=0.5$, and $\mu=0.85$ are set in advance as road surface friction coefficients, and accordingly, the left side tire force calculation section 11 and the right side tire force calculation section 12 may include a $\mu=0.3$ tire model, a $\mu=0.5$ tire model, and a $\mu=0.85$ tire model, respectively, as the tire model for each road surface friction coefficient.

The left side tire force calculation section 11 and the right side tire force calculation section 12 may be configured to calculate the longitudinal tire force and the lateral tire force for each friction coefficient using the provided tire model for each road surface friction coefficient from the slip angles ($\alpha_{FL,Est}$, $\alpha_{FR,Est}$), the slip rates ($\lambda_{FL,Est}$, $\lambda_{FR,Est}$), and the normal forces ($F_{z,FL,Est}$, $F_{z,FR,Est}$) of the corresponding tires that are the respective input values.

The slip angles ($\alpha_{FL,Est}$, $\alpha_{FR,Est}$), the slip rates ($\lambda_{FL,Est}$, $\lambda_{FR,Est}$), and the normal forces ($F_{z,FL,Est}$, $F_{z,FR,Est}$) used as the input of the left side tire force calculation section 11 and the right side tire force calculation section 12 may be obtained from the real-time information collected from the vehicle using a sensor, etc. and the setting information for the corresponding wheel among the left side wheel (the left side tire) (FL) and the right side wheel (the right side tire) (FR), respectively.

Herein, the slip angles ($\alpha_{FL,Est}$, $\alpha_{FR,Est}$) may be lateral slip angles of a wheel (a tire), and since a method and a procedure for estimating the slip angle, the slip rate, and the normal force for the wheels (the tires) of the vehicle in real time are well known in the art, a detailed description thereof will be omitted in the present specification. For example, the slip rates (the wheel slip rates) ($\lambda_{FL,Est}$, $\lambda_{FR,Est}$) may be obtained from the information of the wheel speed and the vehicle speed acquired from a signal of a wheel speed sensor mounted on the corresponding wheel.

In an exemplary embodiment of FIG. 5, the left side tire force calculation section 11 may be configured to calculate and output the longitudinal tire force ($F_{x,FL,0.3}$) and the lateral tire force ($F_{y,FL,0.3}$) of the left side wheel (FL) among the front side wheels using the $\mu=0.3$ tire model. Similarly, in an exemplary embodiment of FIG. 5, the left side tire force calculation section 11 may be configured to calculate and output the longitudinal tire force ($F_{x,FL,0.5}$) and the lateral tire force ($F_{y,FL,0.5}$) of the left side wheel (FL) among the front side wheels even using $\mu=0.5$ tire model.

Further, in an exemplary embodiment of FIG. 5, the left side tire force calculation section 11 may be configured to calculate and output the longitudinal tire force ($F_{x,FL,0.85}$) and the lateral tire force ($F_{x,FL,0.85}$) of the left side wheel (FL) among the front side wheels using $\mu=0.85$ tire model. In addition, in an exemplary embodiment of FIG. 5, the right side tire force calculation section 12 may be configured to calculate and output the longitudinal tire force ($F_{x,FR,0.3}$) and the lateral tire force ($F_{y,FR,0.3}$) of the right side wheel (FR) among the front side wheels using $\mu=0.3$ tire model.

Similarly, in an exemplary embodiment of FIG. 5, the right side tire force calculation section 12 may be configured to calculate and output the longitudinal tire force ($F_{x,FR,0.5}$) and the lateral tire force ($F_{y,FR,0.5}$) of the right side wheel (FR) among the front side wheels using $\mu=0.5$ tire model. In addition, in an exemplary embodiment of FIG. 5, the right side tire force calculation section 12 may be configured to calculate and output the longitudinal tire force ($F_{x,FR,0.85}$) and the lateral tire force ($F_{y,FR,0.85}$) of the right side wheel (FR) among the front side wheels using $\mu=0.85$ tire model.

As described above, the left side tire force calculation section 11 and the right side tire force calculation section 12 of the friction coefficient calculation unit 10 may obtain the longitudinal tire forces ($F_{x,FL,0.3}$, $F_{x,FL,0.5}$, $F_{x,FL,0.85}$, $F_{x,FR,0.3}$, $F_{x,FR,0.5}$, $F_{x,FR,0.85}$) and the lateral tire forces ($F_{y,FL,0.3}$, $F_{y,FL,0.5}$, $F_{y,FL,0.85}$, $F_{y,FR,0.3}$, $F_{y,FR,0.5}$, $F_{y,FR,0.85}$) for each road surface friction coefficient for the tires of the left side wheels and the tires of the right side wheels using the tire model for each road surface friction coefficient.

The tire model used for calculating the longitudinal tire force and the lateral tire force in the left side tire force calculation section 11 and the right side tire force calculation section 12 of the friction coefficient calculation unit 10 may become a plurality of models in which the road surface friction coefficient (μ) is different, and an exemplary embodiment of FIG. 5 is an exemplary embodiment in which the road surface friction coefficient of the tire model is 0.3, 0.5, and 0.85, respectively, but herein, the friction coefficient value of the tire model may be changed. In other words, the tire model in the case where the road surface friction coefficient (μ) is not 0.3, 0.5, or 0.85 but a different value may be used, and the road surface friction coefficient value of the model is not limited to the above numerical values.

In addition, in an exemplary embodiment of FIG. 5, the left side tire force calculation section 11 and the right side tire force calculation section 12 have only a difference in calculating the tire forces for the left side wheel (FL) and the right side wheel (FR), respectively, and have no difference in the method for calculating the longitudinal tire force and the lateral tire force from the input variables (i.e., the slip angle, the slip rate, and the normal force).

The following equations represent model equations of a 'Dugoff-Tire model' as an example of a tire model, all of three tire models for each road surface friction coefficient, that is, tire models with friction coefficients (μ) of 0.3, 0.5, and 0.85 use the same model equation, and only the value of the friction coefficient μ in the equation is used by changing it to the corresponding friction coefficient value.

Tire model: Dug-off-Tire model $$F_x = \frac{C_i s}{1-s} f(\lambda)$$

$$F_y = \frac{C_\alpha \tan\alpha}{1-s} f(\lambda)$$

$$\lambda = \frac{\mu F_z \left[1 - \varepsilon_r V_x \sqrt{s^2 + \tan^2\alpha}\right](1-s)}{2\sqrt{C_i^2 s^2 + C_\alpha^2 \tan^2\alpha}}$$

$$f(\lambda) = \begin{cases} \lambda(2-\lambda) & \text{if } \lambda \leq 1 \\ 1 & \text{if } \lambda > 1 \end{cases}$$

The same model equation may be applied to all of three models. However, only a μ value may be changed to output. Herein, $F_x$ refers the longitudinal tire force to be obtained from the model, $F_y$ to the lateral tire force to be obtained from the model, and $F_z$ to the normal force of the corresponding tire. Further, $C_i$ refers to the tire longitudinal stiffness and $C_\alpha$ to the tire lateral stiffness (also referred to as the cornering stiffness) and s refers to a slip rate, α to a slip angle, and $V_x$ to a vehicle speed. In addition, $\varepsilon_r$ refers to a characteristic value that is predetermined and used according to the tire characteristics, and λ to a value calculated by the above equation.

Further, the model for each friction coefficient used in the left side tire force calculation section 11 and the right side tire force calculation section 12 may be divided into a plurality of tire models only according to the friction coefficient (μ), and the plurality of tire models (the models that are μ=0.3, 0.5, 0.85) used in the two calculation sections 11, 12 may be partially or entirely the same as each other.

As a result, the left side tire force calculation section 11 may obtain the longitudinal tire forces ($F_{x,FL,0.3}$, $F_{x,FL,0.5}$, $F_{x,FL,0.85}$) and the lateral tire forces ($F_{y,FL,0.3}$, $F_{y,FL,0.5}$, $F_{y,FL,0.85}$) predicted when the tire of the left side wheels among the front side wheels having the current slip angle ($\alpha_{FL,Est}$), the current slip rate ($\lambda_{FL,Est}$), and the current normal force ($F_{z,FL,Est}$) estimated and acquired in real time have been applied to another road surface having the respective different friction coefficients (μ=0.3, 0.5, 0.85) using the tire models (the models that are μ=0.3, 0.5, 0.85) for each road surface friction coefficient.

Similarly, the right side tire force calculation section 12 may obtain the longitudinal tire forces ($F_{x,FR,0.3}$, $F_{x,FR,0.5}$, $F_{x,FR,0.85}$) and the lateral tire forces ($F_{y,FR,0.3}$, $F_{y,FR,0.5}$, $F_{y,FR,0.85}$) predicted when the tire of the right side wheels among the front side wheels having the current slip angle ($\alpha_{FR,Est}$), the current slip rate ($\lambda_{FR,Est}$), and the current normal force ($F_{z,FR,Est}$) estimated and acquired in real time have been applied to another road surface having the respective different friction coefficients (μ=0.3, 0.5, 0.85) using the tire models (the models that are μ=0.3, 0.5, 0.85) for each road surface friction coefficient.

The left side tire force calculation section 11 and the right side tire force calculation section 12 may be configured to calculate the longitudinal tire force ($F_x$ in the model equation) and the lateral tire force ($F_y$ in the model equation) of the left side wheel (FL) and the right side wheel (FR), respectively by dividing the left side and the right side of the front side wheels.

In an exemplary embodiment of FIG. 5, 'x' refers to the longitudinal force, 'FL' to the left side wheel among the front side wheels, and '0.3' to the friction coefficient of the tire model in the subscripts of $F_{x,FL,0.3}$, and in $F_{y,FR,0.3}$, 'y' refers to the lateral force, and 'FR' to the right side wheel among the front side wheels. In addition, '0.5' and '0.85' in the subscripts of $F_{x,FL,0.5}$, $F_{x,FL,0.85}$ all refer to the friction coefficients of the tire model.

Next, the friction coefficient estimation section 13 of the friction coefficient calculation unit 10 may be configured to receive the tire force for each road surface friction coefficient, which is a predicted value calculated and output by the tire model for each road surface friction coefficient in the tire force calculation sections 11, 12 as an input, and in addition, may be configured to receive the longitudinal tire forces ($F_{x,FL,Est}$, $F_{x,FR,Est}$) and the lateral tire force ($F_{y,F,Est}$), which are estimated using the information collected from the vehicle as an input.

Herein, the tire force for each road surface friction coefficient is a value that is calculated and predicted by the tire model for each road surface friction coefficient as described above, and refers to the longitudinal tire forces ($F_{x,FL,0.3}$, $F_{x,FL,0.5}$, $F_{x,FL,0.85}$) of the left side wheel (FL), the longitudinal tire forces ($F_{x,FR,0.3}$, $F_{x,FR,0.5}$, $F_{x,FR,0.85}$) of the right side wheel (FR), the lateral tire forces ($F_{y,FL,0.3}$, $F_{y,FL,0.5}$, $F_{y,FL,0.85}$) of the left side wheel (FL), and the lateral tire forces ($F_{y,FR,0.3}$, $F_{y,FR,0.5}$, $F_{y,FR,0.85}$) of the right side wheel (FR), which are calculated by the left side tire force calculation section 11 and the right side tire force calculation section 12 and input to the friction coefficient estimation section 13.

Further, the estimated longitudinal tire force used as another input in the friction coefficient estimation section 13 may include the left side (FL) longitudinal tire force ($F_{x,FL,Est}$) that is the longitudinal tire force of the left side wheel (FL), and the right side (FR) longitudinal tire force $F_{x,FR,Est}$ that is the longitudinal tire force of the right side wheel (FR) by dividing the left side wheel (FL) and the right side wheel (FR) in the front side wheels. However, the estimated lateral tire force used as another input in the friction coefficient estimation section 13 may become one lateral tire force ($F_{y,F,Est}$) obtained by integrating the front side wheels (the front wheels) (F) without division of the left side wheel and the right side wheel.

In calculating the left side (FL) longitudinal tire forces ($F_{x,FL,Est}$), the right side (FR) longitudinal tire forces ($F_{x,FR,Est}$), and the lateral tire forces ($F_{y,F,Est}$) that have been estimated, since a method for estimating the longitudinal tire force and the lateral tire force for each wheel of the vehicle is well known to those skilled in the art, the present disclosure may also calculate and estimate the longitudinal tire forces ($F_{x,FL,Est}$, $F_{x,FR,Est}$) and the lateral tire force ($F_{y,F,Est}$) using one of the known technologies.

When the estimation method in the present disclosure is the method of estimating the longitudinal tire force in the left side wheel and the right side wheel and the method of estimating the lateral tire force, it is not particularly limited, and since the estimation method is a well-known technology in the art to which the present disclosure pertains, a detailed description thereof will be omitted in the present specification.

In FIG. 5, 'Est' in the subscripts of $F_{x,FL,Est}$, $F_{x,FR,Est}$, $F_{y,F,Est}$ indicating the longitudinal tire force and the lateral tire force refers to an estimation value, and distinguishes the longitudinal tire force and lateral tire force of $F_{x,FL,Est}$, $F_{x,FR,Est}$, $F_{y,F,Est}$ are estimated values. These estimated values are distinguished from the predicted values in the friction coefficient that is another input of the friction coefficient estimation section 13, that is, the predicted values calculated by the tire model (the values predicted by the tire model) for each road surface friction coefficient (μ) in the left side tire force calculation section 11 and the right side tire force calculation section 12.

In an exemplary embodiment of the present disclosure, the friction coefficient estimation section 13 may include a first longitudinal force based friction coefficient estimator 13a configured to calculate a longitudinal force based left side road surface friction coefficient ($μ_{Long\_FL}$) using the left side longitudinal tire forces ($F_{x,FL,0.3}$, $F_{x,FL,0.5}$, $F_{x,FL,0.85}$) that are the predicted values calculated by the tire model for each road surface friction coefficient in the left side tire force calculation section 11 and the estimated left side longitudinal tire force ($F_{x,FL,Est}$).

In addition, the friction coefficient estimation section 13 may further include a second longitudinal force based friction coefficient estimator 13b configured to calculate a longitudinal force based right side road surface friction coefficient ($μ_{Long\_FR}$) using the side longitudinal tire forces ($F_{x,FR,0.3}$, $F_{x,FR,0.5}$, $F_{x,FR,0.85}$) that are the predicted values calculated by the tire model for each road surface friction coefficient in the right side tire force calculation section 12 and the estimated right side longitudinal tire force ($F_{x,FR,Est}$). The friction coefficient estimation section 13 may further include a lateral force based friction coefficient estimator 13c for calculating a lateral force based road surface friction coefficient ($μ_{Lat}$) using the left side lateral tire forces ($F_{y,FL,0.3}$, $F_{y,FL,0.5}$, $F_{y,FL,0.85}$) and the right side lateral tire forces ($F_{y,FR,0.3}$, $F_{y,FR,0.5}$, $F_{y,FR,0.85}$) that are the predicted values calculated by the tire model for each road surface friction coefficient in the left side tire force calculation section 11 and the right side tire force calculation section 12, and the estimated lateral tire force ($F_{y,F,Est}$).

As described above, the longitudinal force based friction coefficient estimation section configured to estimate the friction coefficient of the road surface based on the longitudinal tire force in the friction coefficient estimation section 13 may be divided into two components. In other words, the longitudinal force based friction coefficient estimation section is composed of two modules for estimating the road surface friction coefficient using the longitudinal force by dividing the left side wheel and the right side wheel, and may include the first longitudinal force based friction coefficient estimator 13a configured to estimate a left side road surface friction coefficient ($μ_{Long\_FL}$) based on the longitudinal tire forces ($F_{x,FL,0.3}$, $F_{x,FL,0.5}$, $F_{x,FL,0.85}$, $F_{x,FL,Est}$) of the left side wheel (FL) and the second longitudinal force based friction coefficient estimator 13b configured to estimate a right side road surface friction coefficient ($μ_{Long\_FR}$) that is the estimated value by the longitudinal force based on the longitudinal tire forces ($F_{x,FR,0.3}$, $F_{x,FR,0.5}$, $F_{x,FR,0.85}$, $F_{x,FR,Est}$) of the right side wheel (FR).

In contrast, as a module for estimating the road surface friction coefficient using the lateral force in the friction coefficient estimation section 13, the lateral force based friction coefficient estimator 13c configured to estimate a road surface friction coefficient ($μ_{Lat}$) based on the lateral tire forces ($F_{y,FL,0.3}$, $F_{y,FL,0.5}$, $F_{y,FL,0.85}$, $F_{y,FR,0.3}$, $F_{y,FR,0.5}$, $F_{y,FR,0.85}$, $F_{y,F,Est}$) may become one component. In other words, the lateral force based friction coefficient estimator 13c may be configured to estimate the road surface friction coefficient ($μ_{Lat}$) based on the lateral tire forces ($F_{y,FL,0.3}$, $F_{y,FL,0.5}$, $F_{y,FL,0.85}$) for the left side wheel (FL) that are the output values of the left side tire force calculation section 11, the lateral tire forces ($F_{y,FR,0.3}$, $F_{y,FR,0.5}$, $F_{y,FR,0.85}$) for the right side wheel (FR) that are the output values of the right side tire force calculation section 12, and the estimated lateral tire force ($F_{y,F,Est}$) without dividing the left side wheel and the right side wheel.

In summary, the first longitudinal force based friction coefficient estimator 13a may be configured to estimate and output the longitudinal force based left side road surface friction coefficient ($μ_{Long\_FL}$) from the information on the left side wheel (FL), and the second longitudinal force based friction coefficient estimator 13b may be configured to estimate and output the longitudinal force based right side road surface friction coefficient ($μ_{Long\_FR}$) from the information on the right side wheel (FR), and the lateral force based friction coefficient estimator 13c may be configured to estimate and output the lateral force based road surface friction coefficient ($μ_{Lat}$).

Further, the equation used by the friction coefficient estimation section 13 to estimate the friction coefficient using the tire force calculated in the model for each road surface friction coefficient of the tire force calculation sections 11, 12 and the estimated tire force is as follows.

$$\hat{μ}_k = w_k^1 \cdot μ_1 + w_k^2 \cdot μ_2 + w_k^3 \cdot μ_3 \qquad \text{Equation 1}$$

wherein, $μ_1$, $μ_2$, and $μ_3$ refer to predetermined friction coefficients in the tire model and may be $μ_1=0.3$, $μ_2=0.5$, $μ_3=0.85$, and $w_k^1$, $w_k^2$, and $w_k^3$ refer to a weighting factor for each tire model and road surface (i.e., a weighting factor for each road surface friction coefficient).

Further, the $\hat{μ}_k$ in the Equation 1 is the friction coefficient estimated by the friction coefficient estimation section 13 and input to the friction coefficient convergence section 16, that is, the longitudinal force based left side road surface friction coefficient ($μ_{Long\_FL}$), the longitudinal force based right side road surface friction coefficient ($μ_{Long\_FR}$), and the lateral force based road surface friction coefficient ($μ_{Lat}$) ($\hat{μ}_k = μ_{Long\_FL}$, $μ_{Long\_FR}$, $μ_{Lat}$).

The Equation 1 is a formula for estimating the friction coefficients ($μ_{Long\_FL}$, $μ_{Long\_FR}$, $μ_{Lat}$) using the tire force input to the friction coefficient estimation section 13, that is, the values of the longitudinal tire forces ($F_{x,FL,0.3}$, $F_{x,FL,0.5}$, $F_{x,FL,0.85}$, $F_{x,FR,0.3}$, $F_{x,FR,0.5}$, $F_{x,FR,0.85}$) and the lateral tire forces ($F_{y,FL,0.3}$, $F_{y,FL,0.5}$, $F_{y,FL,0.85}$, $F_{y,FR,0.3}$, $F_{y,FR,0.5}$, $F_{y,FR,0.85}$), which are calculated by the model for each road surface friction coefficient of the tire force calculation sections 11, 12, the estimated longitudinal tire force of the left side wheel ($F_{x,FL,Est}$) and the estimated longitudinal tire force of the right side wheel ($F_{x,FR,Est}$), and the estimated lateral tire force ($F_{y,F,Est}$).

Additionally, the weighting factors $w_k^1$, $w_k^2$, and $w_k^3$ in the Equation 1 may be calculated by the following Equation 2 using the tire force calculated in the tire model and the estimated tire force.

$$w_k^i = \frac{p\{z_k \mid Z_{k-1}, r=i\} w_{k-1}^i}{\sum_{j=1}^{L} p\{z_k \mid Z_{k-1}, j\} w_{k-1}^j} \quad \text{Equation 2}$$

wherein, k: Current step, i=1~3 three tire models (0.3, 0.5, 0.85)

$$L = 3, p\{z_k \mid Z_{k-1}, r=i\} = \frac{1}{|2\pi S|} e^{\{-\frac{1}{2}(z_k - x_k^i)S^{-1}(z_k - x_k^i)\}}$$

wherein $z_k$: estimated tire force $x_k^i$: tire force calculated in the model

Figure 6:
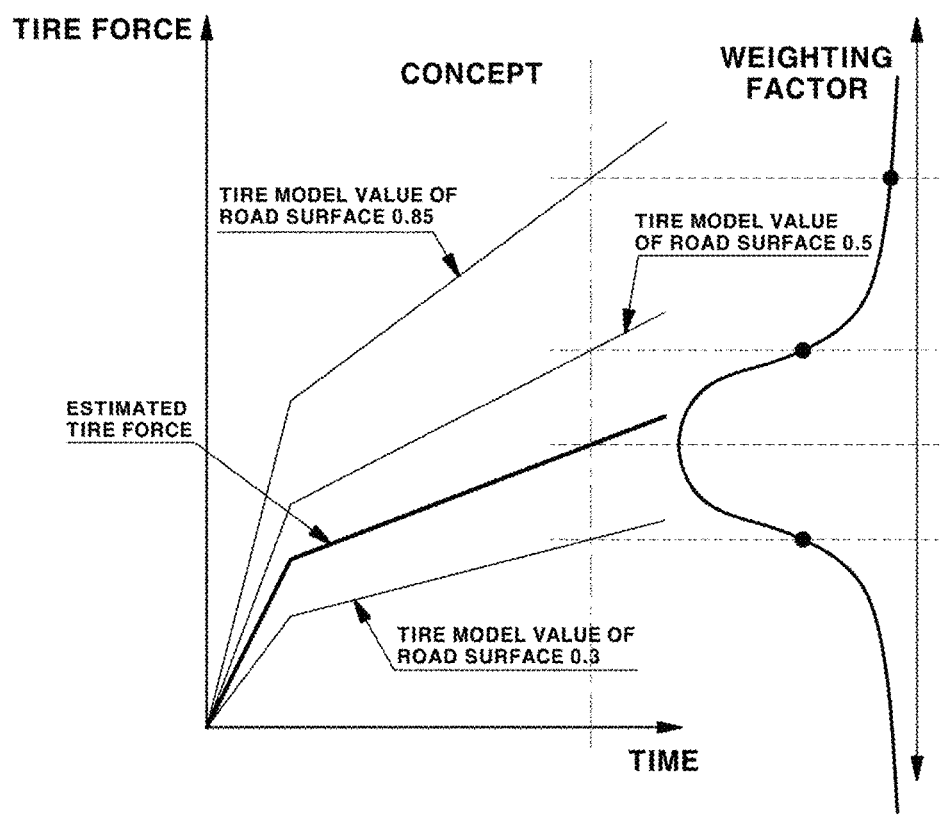
FIG. 6 is a diagram illustrating a concept for a weighting factor according to an exemplary embodiment in the present disclosure.

FIG. 6 is a diagram for explaining a concept of the weighting factor in the present disclosure, and in an exemplary embodiment, when the road surface friction coefficient of the model has been set to 0.3, 0.5, and 0.85, each tire model value, that is, the tire force calculated in the model is different from each other. Further, as in FIG. 6, the weighting factors at arbitrary time may be determined as different values based on the road surface friction coefficient of each model and the force calculated in each model.

The 0.3, 0.5, and 0.85 are merely an example of the friction coefficient applied to each tire model, that is, a first model friction coefficient, a second model friction coefficient, and a third model friction coefficient, and values of the respective model friction coefficients are merely examples, the present disclosure is not limited to the above value, and the model friction coefficient can be changed to various values.

Further, as the tire model to which each predetermined road surface friction coefficient is applied, when the tire model applying the road surface friction coefficient, 0.3 (a first model friction coefficient) is referred to as a first model, the tire model applying the road surface friction coefficient, 0.5 (a second model friction coefficient) is referred to as a second model, and the tire model applying the road surface friction coefficient, 0.85 (a third model friction coefficient) is referred to as a third model, the $w_k^1$, $w_k^2$, and $w_k^3$ are weighting factors determined from the tire force for each model.

Herein, the tire force refers to the tire force predicted by each model and the estimated tire force, and more specifically, in the first longitudinal force based friction coefficient estimator 13a, to calculate the longitudinal force based left side road surface friction coefficient ($\mu_{Long\_FL}$), the $w_k^1$, $w_k^2$, and $w_k^3$ may be calculated using the left side longitudinal tire forces ($F_{x,FL,0.3}$, $F_{x,FL,0.5}$, $F_{x,FL,0.85}$) calculated and predicted by each model and the estimated left side longitudinal tire force ($F_{x,FL,Est}$).

In the second longitudinal force based friction coefficient estimator 13b, to calculate the longitudinal force based right side road surface friction coefficient ($\mu_{Long\_FR}$), the $w_k^1$, $w_k^2$, and $w_k^3$ may be calculated using the right side longitudinal tire forces ($F_{x,FR,0.3}$, $F_{x,FR,0.5}$, $F_{x,FR,0.85}$) calculated and predicted by each model and the estimated right side longitudinal tire force ($F_{x,FR,Est}$). In the lateral force based friction coefficient estimator 13c, to calculate the lateral force based road surface friction coefficient ($\mu_{Lat}$), the $w_k^1$, $w_k^2$, and $w_k^3$ may be calculated using the lateral tire forces ($F_{x,FL,0.3}$, $F_{x,FL,0.5}$, $F_{x,FL,0.85}$, $F_{x,FR,0.3}$, $F_{x,FR,0.5}$, $F_{x,FR,0.85}$) calculated and predicted by each model and the estimated lateral tire force ($F_{y,F,Est}$).

Referring to the Equation 1, the friction coefficients estimated by the friction coefficient estimation section 13, respectively, that is, the longitudinal force based left side road surface friction coefficient ($\mu_{Long\_FL}$), the longitudinal force based right side road surface friction coefficient ($\mu_{Long\_FR}$), and the lateral force based road surface friction coefficient ($\mu_{Lat}$) may be obtained by multiplying the values of $\mu_1$, $\mu_2$, and $\mu_3$ that are the first model friction coefficient, the second model friction coefficient, and the third model friction coefficient, respectively, by the values of weighting factors $w_k^1$, $w_k^2$, and $w_k^3$ calculated by the above method and summing them.

Meanwhile, in the first longitudinal force based friction coefficient estimator 13a, the second longitudinal force based friction coefficient estimator 13b, and the lateral force based friction coefficient estimator 13c of the friction coefficient estimation section 13, when the longitudinal force based left side road surface friction coefficient ($\mu_{Long\_FL}$), the longitudinal force based right side road surface friction coefficient ($\mu_{Long\_FR}$), and the lateral force based road surface friction coefficient ($\mu_{Lat}$) may be obtained by the weighted summation method such as the Equation 1 that multiplies the first, second, and third model friction coefficients, respectively, by the weighting factors $w_k^1$, $w_k^2$, and $w_k^3$ determined by the Equation 2 and sums them, the friction coefficient convergence section 16 may be configured to receive the values of these friction coefficients and finally determine the friction coefficients ($\mu_{FL}$, $\mu_{FR}$) of the left and right side road surfaces on which the left and right side wheels are grounded, respectively.

The friction coefficient convergence section 16 may be configured to estimate the final friction coefficients ($\mu_{FL}$, $\mu_{FR}$) of the left side road surface and the right side road surface on which the left side wheel (FL) and the right side wheel (FR) are grounded, respectively, and receive the values of the friction coefficients ($\mu_{Long\_FL}$, $\mu_{Long\_FR}$, $\mu_{Lat}$) calculated and input by the friction coefficient estimation section 13 to determine the final friction coefficients ($\mu_{FL}$, $\mu_{FR}$).

Figure 7:
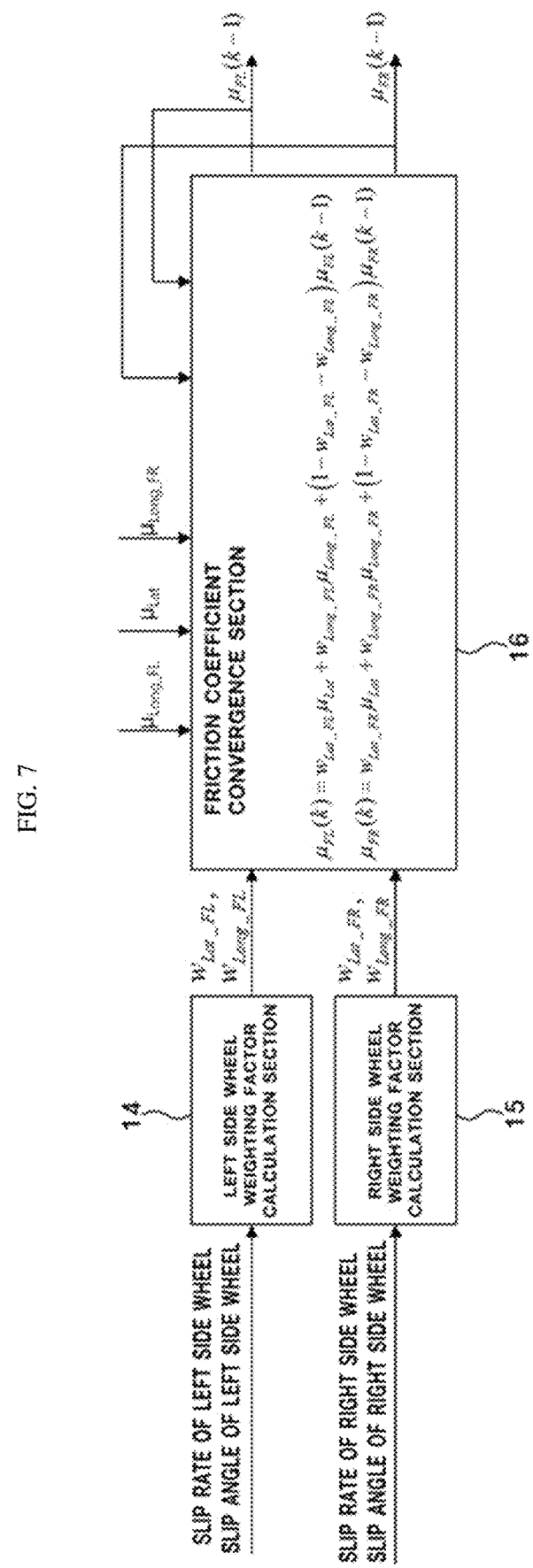
FIG. 7 is a block diagram illustrating a weighting factor calculation section and a friction coefficient convergence section of the friction coefficient calculation unit in the integrated control system according to an exemplary embodiment of the present disclosure.

FIG. 7 is a block diagram illustrating a weighting factor calculation section and a friction coefficient convergence section in the friction coefficient calculation unit, and in an exemplary embodiment of the present disclosure, the friction coefficient calculation unit 10 may further include a left side wheel weighting factor calculation section 14 configured to determine a left side wheel weighting factor, and a right side wheel weighting factor calculation section 15 configured to determine a right side wheel weighting factor.

In addition, the friction coefficient convergence section 16 of the friction coefficient calculation unit 10 may additionally use the values of the weighting factors ($w_{Lat\_FL}$, $w_{Long\_FL}$, $w_{Lat\_FR}$, $w_{Long\_FR}$) determined and input by the left side wheel weighting factor calculation section 14 and the right side wheel weighting factor calculation section 15, respectively together with the values of the friction coefficients ($\mu_{Long\_FL}$, $\mu_{Long\_FR}$, $\mu_{Lat}$), and may be configured to again receive a feedback of the values of the final friction coefficients ('$\mu_{FL}(k-1)$', '$\mu_{FR}(k-1)$' in FIG. 7) determined in a previous control cycle to use for determining the final friction coefficients ('$\mu_{FL}(k)$', '$\mu_{FR}(k)$' in FIG. 7) in a current control cycle.

The left side wheel weighting factor calculation section 14 may be configured to determine, as the left side wheel weighting factor, as illustrated in FIG. 7, the left side wheel longitudinal weighting factor ($w_{Long\_FL}$) and lateral weighting factor ($w_{Lat\_FL}$) corresponding to current slip rate and slip angle from the slip rate and slip angle information of the left side wheel (RL) that is the real-time information collected from the vehicle.

In addition, the right side wheel weighting factor calculation section 15 may be configured to determine, as the right side wheel weighting factor, as illustrated in FIG. 7, the right side wheel longitudinal weighting factor ($w_{Long\_FR}$) and lateral weighting factor ($w_{Lat\_FR}$) corresponding to current slip rate and slip angle from the slip rate and slip angle information of the right side wheel (FR) that is the real-time information collected from the vehicle.

The friction coefficient convergence section 16 may be configured to determine the final friction coefficients ($\mu_{FL}(K), \mu_{FR}(K)$) in the current cycle using the values of the weighting factors ($w_{Lat\_FL}, w_{Long\_FL}, w_{Lat\_FR}, w_{Long\_FR}$) obtained by the two weighting factor calculation sections 14, 15, the values of the friction coefficients ($\mu_{Long\_FL}, \mu_{Long\_FR}, \mu_{Lat}$) input from the friction coefficient estimation section 13, and the values of the feedback input friction coefficients ($\mu_{FL}(k-1), \mu_{FR}(k-1)$) in the previous cycle.

Additionally, the friction coefficient convergence section 16 may then be configured to calculate the current left side road surface friction coefficient ($\mu_{FL}(K)$) using the following Equation 3 from the left side wheel longitudinal weighting factor ($w_{Long\_FL}$) and lateral weighting factor ($w_{Lat\_FL}$) determined by the left side wheel weighting factor calculation section 14, the longitudinal force based left side road surface friction coefficient ($\mu_{Long\_FL}$) and the lateral force based road surface friction coefficient ($\mu_{Lat}$) that are input values in the friction coefficient estimation section 13, and the value of the left side road surface friction coefficient ($\mu_{FL}(k-1)$) in the previous cycle.

Similarly, the friction coefficient convergence section 16 may then be configured to calculate the current right side road surface friction coefficient ($\mu_{FR}(K)$) using the following Equation 4 from the right side wheel longitudinal weighting factor ($w_{Long\_FR}$) and lateral weighting factor ($w_{Lat\_FR}$) determined by the right side wheel weighting factor calculation section 15, the longitudinal force based right side road surface friction coefficient ($\mu_{Long\_FR}$) and the lateral force based road surface friction coefficient ($\mu_{Lat}$) that are input values in the friction coefficient estimation section 13, and the value of the right side road surface friction coefficient ($\mu_{FR}(k-1)$) in the previous cycle.

$$\mu_{FL}(k) = w_{Lat\_FL}\mu_{Lat} + w_{Long\_FL}\mu_{Long\_FL} + (1 - w_{Lat\_FL} - w_{Long\_FL})\mu_{FL}(k-1) \quad \text{Equation 3}$$

$$\mu_{FR}(k) = w_{Lat\_FR}\mu_{Lat} + w_{Long\_FR}\mu_{Long\_FR} + (1 - w_{Lat\_FR} - w_{Long\_FR})\mu_{FR}(k-1) \quad \text{Equation 4}$$

In the Equations 3 and 4, $\mu_{FL}(k)$ refers to a current friction coefficient of the left side road surface, $\mu_{FR}(k)$ to a current friction coefficient of the right side road surface, $\mu_{FL}(k-1)$ to a friction coefficient of the left side road surface determined in a previous control cycle, $\mu_{FR}(k-1)$ to a friction coefficient of the right side road surface determined in a previous control cycle, $w_{Lat\_FL}$ to the left side wheel lateral weighting factor, $\mu_{Lat}$ to the lateral force based road surface friction coefficient, $w_{Long\_FL}$, to the left side wheel longitudinal weighting factor, $\mu_{Long\_FL}$ to the longitudinal force based left side road surface friction coefficient, $w_{Lat\_FR}$ to the right side wheel lateral weighting factor, $w_{Long\_FR}$ to the right side wheel longitudinal weighting factor, and $\mu_{Long\_FR}$ to the longitudinal force based right side road surface friction coefficient.

More specifically explaining the weighting factor calculation sections 14, 15 and the friction coefficient convergence section 16, first, the slip rate of the tire generates the longitudinal tire force (the tire longitudinal force) and the slip angle generates the lateral tire force (the tire lateral force). In addition, the lateral tire force (the lateral force) is different even if the slip angle for each road surface friction coefficient is the same, and the road surface friction coefficient may be estimated by such a difference.

However, when the slip angle is minimal (e.g., less than a predetermined angle), there is no difference in size between high friction and low friction, such that a value of the friction coefficient estimated by the friction coefficient estimation section 13 illustrates low reliability. This is the same even in case of the slip rate that generates the longitudinal tire force (the longitudinal force), and a graph in FIG. 8 is an actual traveling test data on the lateral force for each road surface friction coefficient.

Figure 8:
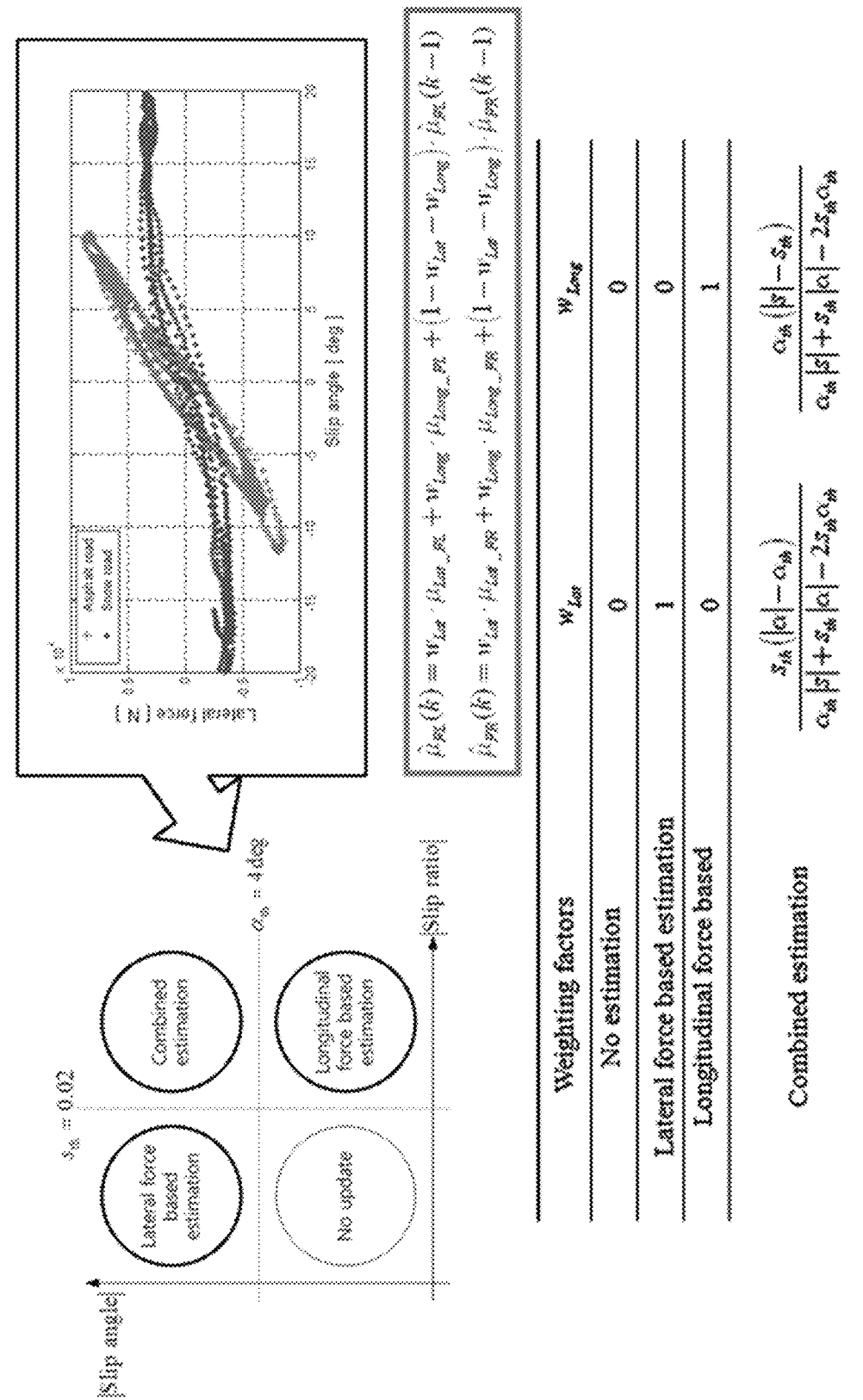
FIG. 8 is a diagram illustrating a method for calculating a friction coefficient using a weighting factor in the friction coefficient convergence section of the integrated control system according to an embodiment of the present disclosure.

FIG. 8 shows that there is no difference between the lateral force [N] due to high friction and the lateral force due to low friction in an area where the slip angle [deg] is minimal. Therefore, to increase the reliability of the estimation, the weighting factor calculation sections 14, 15 configured to calculate the weighting factor of the wheel may be configured to determine the estimated weighting factor based on the slip rate and the slip angle of the wheel. However, when the slip angle and the slip rate are both minimal, the road surface friction coefficient value determined in the previous cycle may be used.

As described above, the friction coefficient calculation unit 10 has been described in detail, and the friction coefficient calculation unit 10 may be configured to estimate the longitudinal tire force and the lateral tire force of the front side wheels (the front wheels) using the signals of the existing sensors mounted on the vehicle, and calculate and predict the longitudinal tire force and the lateral tire force using the tire model for each road surface friction coefficient.

Further, the friction coefficient calculation unit 10 may be configured to estimate the road surface friction coefficient by comparing the estimated tire force with the tire force calculated in the model, and determine a final road surface friction coefficient by applying a weighting factor for each traveling situation to the estimated road surface friction coefficients, thus estimating the friction coefficient in various traveling situations independently of the left and right.

Figure 9:
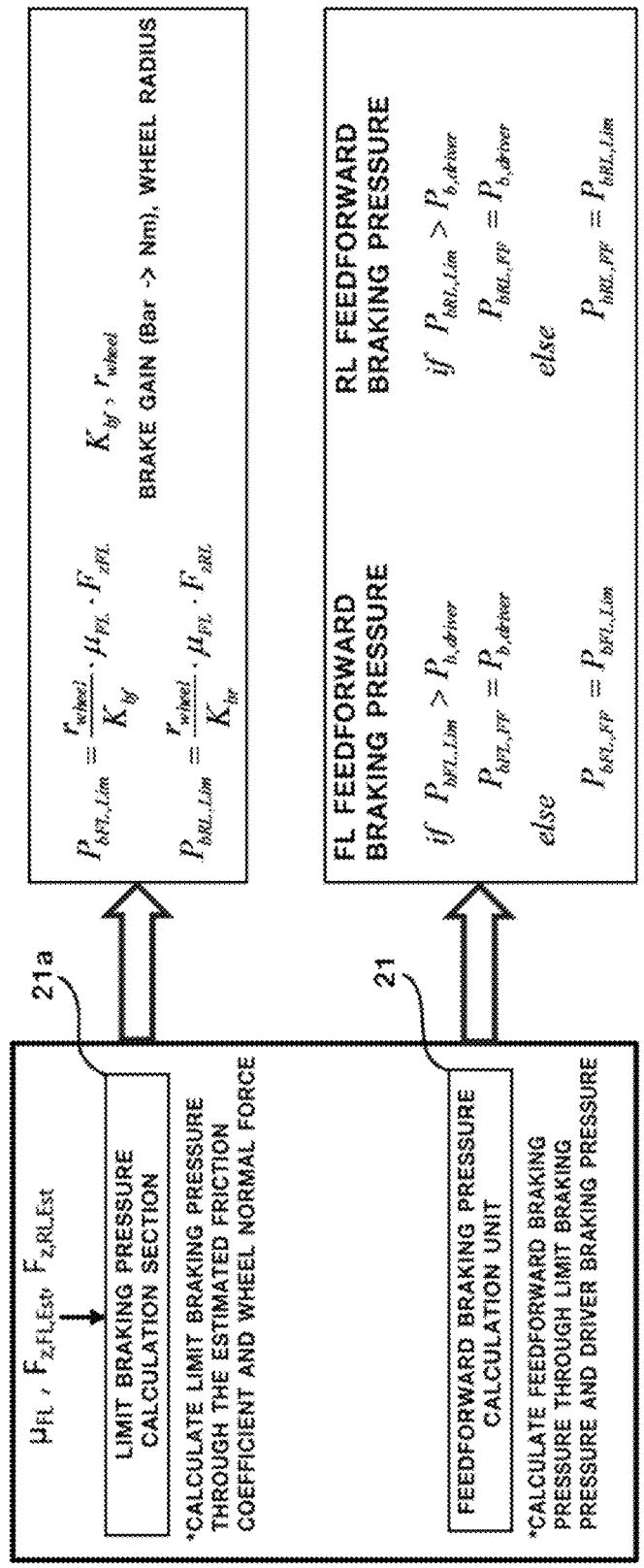
FIG. 9 is a block diagram illustrating a left side wheel feedforward braking pressure calculation unit in the integrated control system according to an exemplary embodiment of the present disclosure.

Next, hereinafter, the feedforward braking pressure calculation units 21, 22 and the ABS braking pressure calculation units 31, 32 will be described in detail. FIG. 9 is a block diagram illustrating the left side wheel feedforward braking pressure calculation unit 21 in the integrated control system according to an exemplary embodiment of the present disclosure.

In particular, the feedforward braking pressure calculation unit may be configured to calculate a feedforward braking pressure for each wheel of the vehicle, and may include the left side wheel feedforward braking pressure calculation unit 21 configured to calculate and output feedforward braking pressures ($P_{bFL,FF}, P_{bRL,FF}$) for the left side wheels (FL, RL), and the right side wheel feedforward braking pressure calculation unit 22 configured to calculate feedforward braking pressures ($P_{bFR,FF}$, $P_{bRR,FF}$) for the right side wheels (FR, RR).

Herein, the left side wheel and the right side wheel mean both the front side wheels and the rear side wheels, and the left side wheel means the left side wheel (FL) of the front side wheels and the left side wheel (RL) of the rear side wheels in the four wheels of the vehicle, and the right side wheel means the right side wheel (FR) of the front side wheels and the right side wheel (RR) of the rear side wheels in four wheels of the vehicle.

As described above, the feedforward braking pressure calculation units 21, 22 may be configured to divide the left side wheels (FL, RL) and the right side wheels (FR, RR); and the left side wheel feedforward braking pressure calculation unit 21 may be configured to calculate the feedforward braking pressures ($P_{bFL,FF}$, $P_{bRL,FF}$) for the left side wheel (FL) of the front side wheels and the left side wheel (RL) of the rear side wheels and the right side wheel feedforward braking pressure calculation unit 22 may be configured to calculate the feedforward braking pressures ($P_{bFR,FF}$, $P_{bRR,FF}$) for the right side wheel (FR) of the front side wheels and the right side wheel (RR) of the rear side wheels.

In addition, each of the feedforward braking pressure calculation units 21, 22 may include a limit braking pressure calculation section 21a, and each of the limit braking pressure calculation sections 21a may be configured to calculate limit braking pressures ($P_{bFL,Lim}$, $P_{bRL,Lim}$, $P_{bFR,Lim}$, $P_{bRR,Lim}$) using the estimated friction coefficients ($\mu_{FL}$, $\mu_{FR}$) and the tire normal forces (the wheel normal force) ($F_{z,FL,Est}$, $F_{z,RL,Est}$, $F_{z,FR,Est}$, $F_{z,RR,Est}$) of each vehicle wheel. In addition, each of the feedforward braking pressure calculation units 21, 22 may be configured to calculate the feedforward braking pressures ($P_{bFL,FF}$, $P_{bRL,FF}$, $P_{bFR,FF}$, $P_{bRR,FF}$) using the limit braking pressures ($P_{bFL,Lim}$, $P_{bRL,Lim}$, $P_{bFR,Lim}$, $P_{bRR,Lim}$) calculated by the limit braking pressure calculation section 21a and a driver braking pressure ($P_{b,driver}$).

The estimated friction coefficients ($\mu_{FL}$, $\mu_{FR}$) are values calculated by the friction coefficient calculation unit 10 and input to the feedforward braking pressure calculation units 21, 22 ($\mu_{Left}$, $\mu_{Right}$ in FIG. 4), the tire normal force is a force estimated using the information collected from the vehicle such as the state information of the vehicle wheel and the setting information, and the driver braking pressure ($P_{b,driver}$) is a braking pressure based on the driver's brake pedal operation value detected by the sensor.

Explaining the left side wheel as an example, the left side wheel feedforward braking pressure calculation unit 21 may be configured to calculate the limit braking pressures ($P_{bFL,Lim}$, $P_{bRL,Lim}$) for the left side wheels (FL, RL) by the limit braking pressure calculation section 21a, and determine the limit braking pressure ($P_{bFL,Lim}$) for the left side wheel (FL) in the front side wheels, and the limit braking pressure ($P_{bRL,Lim}$) for the left side wheel (RL) in the rear side wheels, respectively.

Herein, the limit braking pressure calculation section 21a may be configured to calculate, as illustrated in FIG. 9, the limit braking pressures ($P_{bFL,Lim}$, $P_{bRL,Lim}$) using the friction coefficient ($\mu_{FL}$) of the left side road surface and the tire normal forces ($F_{z,FL,Est}=F_{zFL}$, $F_{z,RL,Est}=F_{zRL}$) of the left side wheel, and the friction coefficient ($\mu_{FL}$) of the left road surface is a friction coefficient calculated and input by the friction coefficient calculation unit 10.

In addition, the limit braking pressure ($P_{bFL,Lim}$) for the left side wheel (FL) in the front side wheels may be calculated from the friction coefficient ($\mu_{FL}$) of the left side road surface and the tire normal force ($F_{z,FL,Est}=F_{zFL}$) of the left side wheel (FL) in the front side wheels using the following Equation 5, and the limit braking pressure ($P_{bRL,Lim}$) for the left side wheel (RL) in the rear side wheels may be calculated from the friction coefficient ($\mu_{FL}$) of the left side road surface and the tire normal force ($F_{z,RL,Est}=F_{z,RL}$) of the left side wheel (RL) in the rear side wheels using the following Equation 6.

$$P_{bFL,Lim} = \frac{r_{wheel}}{K_{bf}} \cdot \mu_{FL} \cdot F_{zFL} \qquad \text{Equation 5}$$

$$P_{bRL,Lim} = \frac{r_{wheel}}{K_{br}} \cdot \mu_{FL} \cdot F_{zRL} \qquad \text{Equation 6}$$

wherein, $K_{bf}$ and $K_{br}$ refer to predetermined brake gain values, and may be unit conversion coefficients (bar→Nm) ($K_{bf}=K_{br}$), and $r_{wheel}$ to a wheel radius.

Further, when the limit braking pressures ($P_{bFL,Lim}$, $P_{bRL,Lim}$) are greater than the driver braking pressure ($P_{b,driver}$) by comparing the calculated limit braking pressures ($P_{bFL,Lim}$, $P_{bRL,Lim}$) of the left side wheels (FL, RL) with the driver braking pressure ($P_{b,driver}$), as illustrated in FIG. 9, the feedforward braking pressures ($P_{bFL,FF}$, $P_{bRL,FF}$) of the left side wheel may be determined as the driver braking pressure ($P_{b,driver}$) On the other hand, when the limit braking pressures ($P_{bFL,Lim}$, $P_{bRL,Lim}$) are equal to or less than the driver braking pressure ($P_{b,driver}$), as illustrated in FIG. 9, the feedforward braking pressures ($P_{bFL,FF}$, $P_{bRL,FF}$) of the left side wheel may be determined as the limit braking pressures ($P_{bFL,Lim}$, $P_{bRL,Lim}$).

When the limit braking pressure ($P_{bFL,Lim}$) for the left side wheel (FL) in the front side wheels is greater than the driver braking pressure ($P_{b,driver}$), the feedforward braking pressure ($P_{bFL,FF}$) for the left side wheel in the front side wheels may be determined as the driver braking pressure ($P_{b,driver}$) When the limit braking pressure ($P_{bFL,Lim}$) for the left side wheel (FL) in the front side wheels is equal to or less than the driver braking pressure ($P_{b,driver}$), the feedforward braking pressure ($P_{bFL,FF}$) for the left side wheel in the front side wheels may be determined as the limit braking pressure ($P_{bFL,Lim}$) for the left side wheel in the front side wheels.

Similarly, when the limit braking pressure ($P_{bRL,Lim}$) for the left side wheel (RL) in the rear side wheels is greater than the driver braking pressure ($P_{b,driver}$), the feedforward braking pressure ($P_{bRL,FF}$) for the left side wheel in the rear side wheels may be determined as the driver braking pressure ($P_{b,driver}$) Further, when the limit braking pressure ($P_{bRL,Lim}$) for the left side wheel (RL) in the rear side wheels is equal to or less than the driver braking pressure ($P_{b,driver}$), the feedforward braking pressure ($P_{bRL,FF}$) for the left side wheel in the rear side wheels may be determined as the limit braking pressure ($P_{bRL,Lim}$) for the left side wheel in the rear side wheels.

As described above, the procedure in which the left side wheel feedforward braking pressure calculation unit 21 determines the feedforward braking pressures ($P_{bFL,FF}$, $P_{bRL,FF}$) for the left side wheels (FL, RL) has been explained, and the procedure in which the right side wheel feedforward braking pressure calculation unit 22 determines the feedforward braking pressures ($P_{bFR,FF}$, $P_{bRR,FF}$) for the right side wheels (FR, RR) has no difference from that of the left side wheel feedforward braking pressure calculation unit 21 in terms of the method.

In other words, the process in which the right side wheel feedforward braking pressure calculation unit 22 determines the feedforward braking pressures ($P_{bFR,FF}$, $P_{bRR,FF}$) for the right side wheels (FR, RR) may be explained by replacing the left side wheel with the right side wheel in the explanation for the procedure in which the left side wheel feedforward braking pressure calculation unit 21 determines the feedforward braking pressure for the left side wheel.

The right side wheel feedforward braking pressure calculation unit 22 may also include the limit braking pressure calculation section configured to calculate the limit braking pressures ($P_{bFR,Lim}$, $P_{bRR,Lim}$) for the right side wheel (FR) in the front side wheels and the right side wheel (RR) in the rear side wheels, and as in the above-described left side wheel feedforward braking pressure calculation unit 21, the feedforward braking pressures ($P_{bFR,FF}$, $P_{bRR,FF}$) for the right side wheel may be determined by comparing the limit braking pressures ($P_{bFR,Lim}$, $P_{bRR,Lim}$) calculated by the limit braking pressure calculation section and the driver braking pressure ($P_{b,driver}$).

An Equation for calculating the limit braking pressures ($P_{bFR,Lim}$, $P_{bRR,Lim}$) for the right side wheels (FR, RR) is as follows.

$$P_{bFR,Lim} = \frac{r_{wheel}}{K_{bf}} \cdot \mu_{FR} \cdot F_{zFR} \qquad \text{Equation 7}$$

$$P_{bRR,Lim} = \frac{r_{wheel}}{K_{br}} \cdot \mu_{FR} \cdot F_{zRR} \qquad \text{Equation 8}$$

wherein, $F_{zFR}$ and $F_{zRR}$ refer to tire normal forces of the right side wheels (FR, RR).

Moreover, the ABS braking pressure calculation unit may be configured to calculate the ABS braking pressure of each wheel of the vehicle, and may include a left side wheel ABS braking pressure calculation unit 31 configured to calculate and output ABS braking pressures ($P_{bFL,ABS}$, $P_{bRL,ABS}$) for the left side wheels (FL, RL), and a right side wheel ABS braking pressure calculation unit 32 configured to calculate ABS braking pressures ($P_{bFR,ABS}$, $P_{bRR,ABS}$) for the right side wheels (FR, RR).

Herein, the left side wheel and the right side wheel mean both the front side wheels and the rear side wheels, respectively; and the left side wheel means the left side wheel (FL) in the front side wheels and the left side wheel (RL) in the rear side wheels in the four wheels of the vehicle and the right side wheel means the right side wheel (FR) in the front side wheels and the right side wheel (RR) in the rear side wheels in four wheels of the vehicle.

As described above, similar to the feedforward braking pressure calculation units 21, 22, the ABS braking pressure calculation units 31, 32 may also divide the left side wheels (FL, RL) and the right side wheels (FR, RR), and the left side wheel ABS braking pressure calculation unit 31 may be configured to calculate the ABS braking pressures ($P_{bFL,ABS}$, $P_{bRL,ABS}$) for the left side wheel (FL) in the front side wheels and the left side wheel (RL) in the rear side wheels, and the right side wheel ABS braking pressure calculation unit 32 may be configured to calculate the ABS braking pressures ($P_{bFR,ABS}$, $P_{bRR,ABS}$) for the right side wheel (FR) in the front side wheels and the right side wheel (RR) in the rear side wheels.

In addition, each of the ABS braking pressure calculation units 31, 32 may be configured to calculate the ABS braking pressures ($P_{bFL,ABS}$, $P_{bFR,ABS}$, $P_{bRL,ABS}$, $P_{bRR,ABS}$) using the feedforward braking pressures ($P_{bFL,FF}$, $P_{bFR,FF}$, $P_{bRL,FF}$, $P_{bRR,FF}$), a target slip rate ($\lambda_{Target}$), and current slip rates ($\lambda_{FL}$, $\lambda_{FR}$, $\lambda_{RL}$, $\lambda_{RR}$) of the corresponding wheel. The feedforward braking pressure ($P_{bFL,FF}$, $P_{bFR,FF}$, $P_{bRL,FF}$, $P_{bRR,FF}$) may be obtained by the feedforward braking pressure calculation units 21, 22 and input to the ABS braking pressure calculation units 31, 32, and since the target slip rate ($\lambda_{Target}$) is a value obtained in the normal ABS control procedure, a detailed description such as the calculation method will be omitted.

Further, the current slip rates ($\lambda_{FL}$, $\lambda_{FR}$, $\lambda_{RL}$, $\lambda_{RR}$) of each wheel are estimated values ($\lambda_{FL,Est}$, $\lambda_{FR,Est}$, $\lambda_{RL,Est}$, $\lambda_{RR,Est}$) obtained from the information of the wheel speed and the vehicle speed detected by a sensor, and since the calculation method thereof is also well known, a description thereof will be omitted.

Explaining the left side wheel as an example, the left side wheel ABS braking pressure calculation unit 31 may be configured to calculate the ABS braking pressures ($P_{bFL,ABS}$, $P_{bRL,ABS}$) for the left side wheel from the feedforward braking pressures ($P_{bFL,FF}$, $P_{bRL,FF}$) input from the left side wheel feedforward braking pressure calculation unit 21, the target slip rate ($\lambda_{Target}$), and the current slip rates ($\lambda_{FL}$, $\lambda_{RL}$) of the left side wheel using the following Equations 9 and 10.

$$P_{bFL,ABS} = P_{bFL,FF} + k(\lambda_{Target} - \lambda_{FL}) \qquad \text{Equation 9}$$

$$P_{bRL,ABS} = P_{bRL,FF} + k(\lambda_{Target} - \lambda_{RL}) \qquad \text{Equation 10}$$

wherein, k refers to a predetermined control gain.

As described above, the procedure in which the left side wheel ABS braking pressure calculation unit 31 determines the ABS braking pressures ($P_{bFL,ABS}$, $P_{bRL,ABS}$) for the left side wheels (FL, RL) has been explained, and the procedure in which the right side wheel ABS braking pressure calculation unit 32 determines the ABS braking pressures ($P_{bFR,ABS}$, $P_{bRR,ABS}$) for the right side wheels (FR, RR) has no difference from that of the left side wheel ABS braking pressure calculation unit 31 in terms of the method.

In other words, the procedure in which the right side wheel ABS braking pressure calculation unit 32 determines the ABS braking pressures ($P_{bFR,ABS}$, $P_{bRR,ABS}$) for the right side wheels (FR, RR) may be explained by replacing the left side wheel with the right side wheel in the explanation of the procedure in which the left side wheel ABS braking pressure calculation unit 31 determines the ABS braking pressure for the left side wheel.

Additionally, the right side wheel ABS braking pressure calculation unit 32 may be configured to calculate the ABS braking pressures ($P_{bFR,ABS}$, $P_{bRR,ABS}$) for the right side wheel using the feedforward braking pressures ($P_{bFR,FF}$, $P_{bRR,FF}$) input by the right side wheel feedforward braking pressure calculation unit 22, the target slip rate ($\lambda_{Target}$), and current slip rates ($\lambda_{FR}$, $\lambda_{RR}$) of the right side wheel. This may be expressed by the following Equations 11 and 12.

$$P_{bFR,ABS} = P_{bFR,FF} + k(\lambda_{Target} - \lambda_{FR}) \qquad \text{Equation 11}$$

$$P_{bRR,ABS} = P_{bRR,FF} + k(\lambda_{Target} - \lambda_{RR}) \qquad \text{Equation 12}$$

As shown by Equations 9, 10, 11, and 12, the ABS braking pressure calculation units 31, 32 may be configured to calculate final ABS braking pressures ($P_{bFF,ABS}$, $P_{bFL,ABS}$, $P_{bFR,ABS}$, $P_{bRR,ABS}$) of each wheel of the vehicle by adding or subtracting the braking pressure according to whether the wheel has slipped based on the feedforward braking pressures ($P_{bFF,FF}$, $P_{bFL,FF}$, $P_{bFR,FF}$, $P_{bRR,FF}$) of the left side wheel and the right side wheel input from the feedforward braking pressure calculation units 21, 22.

The rear wheel steering control amount calculation unit 40 may then be configured to calculate a rear wheel steering (RWS) control amount ($\Delta\delta_{RWS}$) for yaw compensation. In other words, depending on the ABS braking pressure of each wheel of the vehicle obtained by the left side wheel ABS braking pressure calculation unit 31 and the right side wheel ABS braking pressure calculation unit 32, the yaw behavior of the vehicle may be caused by the left and right asymmetric braking, and the rear wheel steering control amount calculation unit 40 may be configured to calculate the rear wheel steering control amount for compensating the above.

Accordingly, the rear wheel steering control amount calculation unit 40 may be configured to calculate a yaw moment ($\Delta M_z$) generated by the asymmetric braking pressure from the ABS braking pressures ($P_{bFL,ABS}$, $P_{bRL,ABS}$, $P_{bFR,ABS}$, $P_{bRR,ABS}$), which are calculated and input by the ABS braking pressure calculation unit, using the following Equation 13.

$$\Delta M_z = -\frac{t_f K_{bf}}{r_{wheel}}(P_{bFL,ABS} - P_{bFR,ABS}) - \frac{t_r K_{br}}{r_{wheel}}(P_{bRL,ABS} - P_{bRR,ABS}) \qquad \text{Equation 13}$$

wherein, $t_f$ refers to the axial length between the left side wheel and the right side wheel of the front side wheels, and $t_r$ to the axial length between the left side wheel and the right side wheel of the rear side wheels.

The yaw moment ($\Delta M_z$) calculated by the Equation 13 refers to a yaw moment amount that is generated unintentionally and additionally by the asymmetric braking pressure in the braking situation where the friction coefficient of the left side road surface and the friction coefficient of the right side road surface are different from each other when the driver brakes the vehicle.

Further, the rear wheel steering control amount calculation unit 40 may be configured to finally calculate the rear wheel steering (RWS) control amount ($\Delta\delta_{RWS}$) for compensating the yaw moment ($\Delta M_z$) calculated by the Equation 13, and the rear wheel steering control amount ($\Delta\delta_{RWS}$), that is, the rear wheel steering angle of the RWS is calculated from the calculated yaw moment ($\Delta M_z$) using the following Equation 14.

$$\Delta\delta_{RWS} = \frac{\Delta M_z}{l_r \cdot C_r} \qquad \text{Equation 14}$$

wherein, $l_r$ refers to a distance from the center of gravity of the vehicle to the shaft of the rear side wheels (rear wheels), $C_r$ to the cornering stiffness of the rear side wheels, and both $l_r$ and $C_r$ to predetermined setting information for use of the Equation 14.

As described above, after the rear wheel steering control amount calculation unit 40 calculates the rear wheel steering control amount ($\Delta\delta_{RWS}$), the rear wheel steering controller 50 may be configured to execute a rear wheel steering control based on the rear wheel steering control amount ($\Delta\delta_{RWS}$) calculated and input by the rear wheel steering control amount calculation unit 40. As described above, according to the integrated control system for the vehicle according to an exemplary embodiment of the present disclosure, it may be possible to improve braking performance as a chattering phenomenon is reduced upon ABS operation.

The conventional ABS adds or subtracts the braking pressure according to the slip rate based on the driver braking pressure, but when the driver braking pressure that is much greater than the limit braking force capable of braking is applied, the slip rate may exceed, a substantial amount of braking pressure may be added or subtracted for compensating it, thus resulting in an excessive braking pressure chattering phenomenon. The present disclosure may estimate the road surface friction coefficient, then calculate the limit braking pressure using the estimated value, and add or subtract the braking pressure for compensating the slip rate within the calculated limit braking pressure, thus mitigating the chattering phenomenon and improving braking performance.

Figure 10:
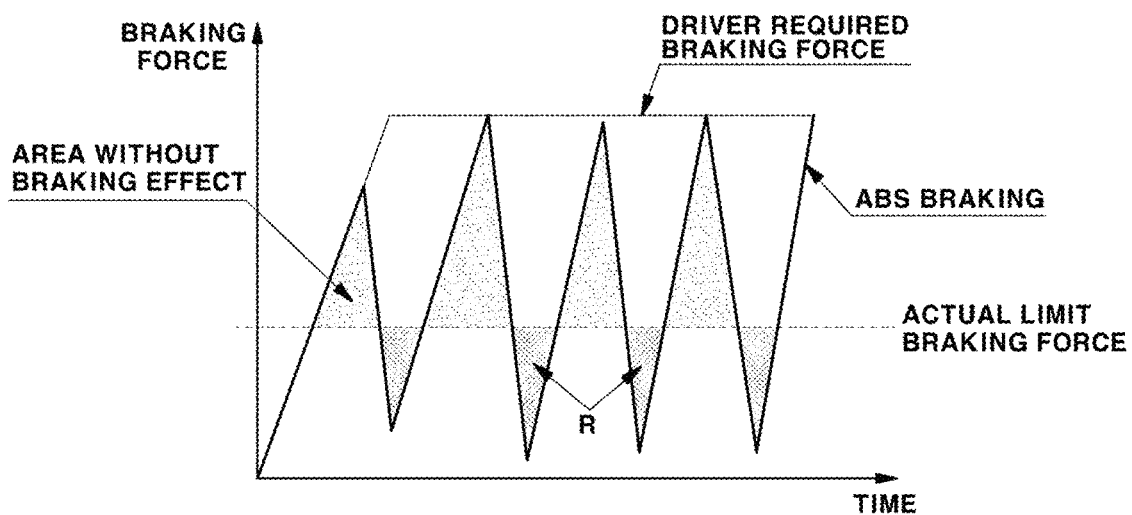
FIG. 10 is a diagram embodying a conventional chattering phenomenon upon ABS operation according to the prior art.

Additionally, in the conventional case, since the braking pressure is added or subtracted based on the driver's required braking force (i.e., the driver braking pressure), the control gain should be substantial and thereby excessive chattering phenomenon is caused by the large control gain as illustrated in FIG. 10. As a result, the braking performance is adversely affected by an 'R' area in FIG. 10.

Figure 11:
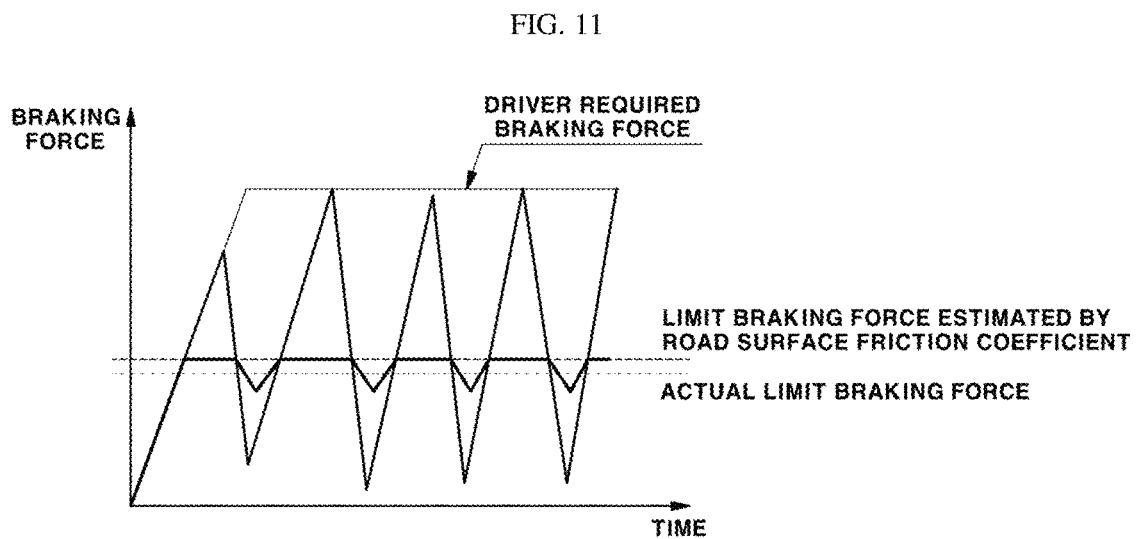
FIG. 11 is a diagram illustrating that the chattering phenomenon is improved according to an exemplary embodiment of the present disclosure.

On the other hand, the present disclosure may reduce the gain for the slip rate control to reduce the chattering phenomenon, as shown in FIG. 11, thus improving braking performance. In addition, according to the present disclosure, it may be possible to perform the RWS system control that may independently estimate the friction coefficients of the left side and right side road surfaces, thus improving the left and right braking performance and compensating the yaw behavior according to the left and right asymmetric braking performance, thus implementing a stable vehicle braking.

As described above, while exemplary embodiments of the present disclosure have been described in detail, the scope of the present disclosure is not limited thereto, and various modifications and improvements by those skilled in the art using the basic concept of the present disclosure defined in the following claims is also included in the scope of the present disclosure.

What is claimed is:

1. An integrated control system for a vehicle, comprising:
    a friction coefficient calculation unit configured to calculate a friction coefficient of a left side road surface and a right side road surface, respectively, on which a left side wheel and a right side wheel are grounded in a road surface based on vehicle wheel state information and a predetermined setting information collected from the vehicle upon anti-lock brake system (ABS) operation;
    a feedforward braking pressure calculation unit configured to calculate a feedforward braking pressure of each vehicle wheel using the calculated friction coefficients of the left side road surface and the right side road surface;
    an ABS braking pressure calculation unit configured to calculate an ABS braking pressure of the each vehicle wheel based on the calculated feedforward braking pressure and information of the vehicle wheel;
    a rear wheel steering control amount calculation unit configured to calculate a rear wheel steering control amount for yaw compensation using the calculated ABS braking pressure of each vehicle wheel; and
    a rear wheel steering controller configured to perform a rear wheel steering control of the vehicle based on the calculated rear wheel steering control amount,
    wherein the feed forward braking pressure calculation unit is configured to calculate a limit braking pressure using the calculated friction coefficient, and add or subtract the braking pressure for compensating a slip rate of each vehicle wheel within the calculated limit braking pressure to mitigate chattering, wherein the friction coefficient calculation unit includes a friction coefficient convergence section configured to calculate the friction coefficient of the left side road surface and the right side road surface using the longitudinal force based left side road surface friction coefficient, the longitudinal force based right side road surface friction coefficient, and the lateral force based on the calculated road surface friction coefficient, and wherein the friction coefficient convergence section is configured to:

calculate the current friction coefficient of the left side road surface and the current friction coefficient of the right side road surface using the longitudinal force based left side road surface friction coefficient, the longitudinal force based right side road surface friction coefficient, the lateral force based road surface friction coefficient, the weighting factors, and the friction coefficient determined in the previous control cycle using the following E1 and E2, $$\mu_{FL}(k) = w_{Lat\_FL}\mu_{Lat} + w_{Long\_FL}\mu_{Long\_FL} + (1 - w_{Lat\_FL} - w_{Long\_FL})\mu_{FL}(k-1) \quad \text{E1}$$

$$\mu_{FR}(k) = w_{Lat\_FR}\mu_{Lat} + w_{Long\_FR}\mu_{Long\_FR} + (1 - w_{Lat\_FR} - w_{Long\_FR})\mu_{FR}(k-1) \quad \text{E2}$$

wherein, $\mu_{FL}(k)$ refers to the current friction coefficient of the left side road surface, $\mu_{FR}(k)$ to the current friction coefficient of the right side road surface, $\mu_{FL}(k-1)$ to the friction coefficient of the left side road surface determined in the previous control cycle, $\mu_{FR}(k-1)$ to the friction coefficient of the right side road surface determined in the previous control cycle, $w_{Lat\_FL}$ to the left side wheel lateral weighting factor, $\mu_{Lat}$ to the lateral force based road surface friction coefficient, $w_{Long\_FL}$ to the left side wheel longitudinal weighting factor, $\mu_{Long\_FL}$ to the longitudinal force based left side road surface friction coefficient, $w_{Lat\_FR}$ to the right side wheel lateral weighting factor, $w_{Long\_FR}$ to the right side wheel longitudinal weighting factor, and $\mu_{Long\_FR}$ to the longitudinal force based right side road surface friction coefficient.

2. The integrated control system for the vehicle of claim 1, wherein the friction coefficient calculation unit further includes:

a tire force calculation section configured to predict and calculate a tire force of the left side wheel and a tire force of the right side wheel for each road surface friction coefficient using a predetermined tire model for each road surface friction coefficient from the vehicle wheel state information, respectively; and a friction coefficient estimation section configured to calculate a longitudinal force based left side road surface friction coefficient, a longitudinal force based right side road surface friction coefficient, and a lateral force based road surface friction coefficient from the tire force of the left side wheel and the right side wheel for each predicted road surface friction coefficient, and the estimated longitudinal and lateral tire force.

3. The integrated control system for the vehicle of claim 2, wherein the tire force calculation section includes:

a left side tire force calculation section configured to calculate the tire force of the left side wheel in a front side wheel of the vehicle for each road surface friction coefficient using the predetermined tire model for the each road surface friction coefficient; and a right side tire force calculation section configured to calculate the tire force of the right side wheel in the front side wheel of the vehicle for each road surface friction coefficient using the predetermined tire model for the each road surface friction coefficient.

4. The integrated control system for the vehicle of claim 2, wherein the tire force calculation section is configured to calculate the longitudinal tire force and the lateral tire force for each road surface friction coefficient of the corresponding wheel, respectively, as the tire force of the left side wheel and the tire force of the right side wheel.

5. The integrated control system for the vehicle of claim 4, wherein the estimated longitudinal tire force used in the friction coefficient estimation section includes the longitudinal tire force of the left side wheel and the right side wheel in the front side wheel of the vehicle.

6. The integrated control system for the vehicle of claim 5, wherein the friction coefficient estimation section includes:

a first longitudinal force based friction coefficient estimation section configured to calculate the longitudinal force based left side road surface friction coefficient using the longitudinal tire force of the left side wheel for each road surface friction coefficient and the estimated longitudinal tire force of the left side wheel;

a second longitudinal force based friction coefficient estimation section configured to calculate the longitudinal force based right side road surface friction coefficient using the longitudinal tire force of the right side wheel for each road surface friction coefficient and the estimated longitudinal tire force of the right side wheel; and a lateral force based friction coefficient estimation section configured to calculate the lateral force based road surface friction coefficient using the lateral tire force of the left side wheel for each road surface friction coefficient, the lateral tire force of the right side wheel for each road surface friction coefficient, and the estimated lateral tire force.

7. The integrated control system for the vehicle of claim 6, wherein the first longitudinal force based friction coefficient estimation section is configured to:

determine a weighting factor for each road surface friction coefficient using a predetermined equation from the longitudinal tire force of the left side wheel for each road surface friction coefficient and the estimated longitudinal tire force of the left side wheel; and calculate the longitudinal force based left side road surface friction coefficient by multiplying each road surface friction coefficient of the predetermined tire model by the determined weighting factor for each road surface friction coefficient and summing them.

8. The integrated control system for the vehicle of claim 6, wherein the second longitudinal force based friction coefficient estimation section is configured to:

determine a weighting factor for each road surface friction coefficient using a predetermined equation from the longitudinal tire force of the right side wheel for each road surface friction coefficient and the estimated longitudinal tire force of the right side wheel; and calculate the longitudinal force based right side road surface friction coefficient by multiplying each road surface friction coefficient of the predetermined tire model by the determined weighting factor for each road surface friction coefficient and summing them.

9. The integrated control system for the vehicle of claim 6, wherein the lateral force based friction coefficient estimation section is configured to:
- determine a weighting factor for each road surface friction coefficient using a predetermined equation from the lateral tire force of the left side wheel for each road surface friction coefficient, the lateral tire force of the right side wheel for each road surface friction coefficient, and the estimated lateral tire force; and
- calculate the lateral force based road surface friction coefficient by multiplying each road surface friction coefficient of the predetermined tire model by the determined weighting factor for each road surface friction coefficient and summing them.

10. The integrated control system for the vehicle of claim 2, wherein the vehicle wheel state information in the tire force calculation section includes a slip angle, a slip rate, and a normal force of the corresponding wheel.

11. The integrated control system for the vehicle of claim 2, wherein the estimated longitudinal tire force used in the friction coefficient estimation section includes the longitudinal tire force of the left side wheel and the longitudinal tire force of the right side wheel in the front side wheel of the vehicle.

12. The integrated control system for the vehicle of claim 2, wherein the friction coefficient calculation unit further includes:
- a left side wheel weighting factor calculation section configured to determine a left side wheel longitudinal weighting factor and a left side wheel lateral weighting factor from the slip rate and slip angle information of the left side wheel as the vehicle wheel state information collected from the vehicle; and
- a right side wheel weighting factor calculation section configured to determine a right side wheel longitudinal weighting factor and a right side wheel lateral weighting factor from the slip rate and slip angle information of the right side wheel as the vehicle wheel state information, wherein the friction coefficient convergence section is configured to:
- calculate a current friction coefficient of the left side road surface and a current friction coefficient of the right side road surface using the longitudinal force based left side road surface friction coefficient, the longitudinal force based right side road surface friction coefficient, and the lateral force based road surface friction coefficient calculated by the friction coefficient estimation section, the weighting factors determined by the left side wheel weighting factor calculation section and the right side wheel weighting factor calculation section, and the friction coefficient determined in a previous control cycle.

13. The integrated control system for the vehicle of claim 1, wherein the feedforward braking pressure calculation unit includes:
- a limit braking pressure calculation section configured to calculate a limit braking pressure using the calculated friction coefficient of the left side road surface and the right side road surface, and a tire normal force of the vehicle wheel, wherein the feedforward braking pressure calculation unit is configured to calculate the feedforward braking pressure of each vehicle wheel based on a driver braking pressure according to a brake pedal operation of a driver and the calculated limit braking pressure calculated.

14. The integrated control system for the vehicle of claim 13, wherein the feedforward braking pressure calculation unit includes:
- a left side wheel feedforward braking pressure calculation unit including the limit braking pressure calculation section configured to calculate the limit braking pressure of the left side wheel from the friction coefficient of the left side road surface and the tire normal force of the left side wheel, and calculate the feedforward braking pressure of the left side wheel from the calculated limit braking pressure of the left side wheel and the driver braking pressure; and
- a right side wheel feedforward braking pressure calculation unit including the limit braking pressure calculation section configured to calculate the limit braking pressure of the right side wheel from the friction coefficient of the right side road surface and the tire normal force of the right side wheel, and calculate the feedforward braking pressure of the right side wheel from the calculated limit braking pressure of the right side wheel and the driver braking pressure.

15. The integrated control system for the vehicle of claim 14, wherein the ABS braking pressure calculation unit includes:
- a left side wheel ABS braking pressure calculation unit configured to calculate an ABS braking pressure of the left side wheel from the calculated feedforward braking pressure of the left side wheel, a target slip rate, and a current slip rate of the left side wheel; and
- a right side wheel ABS braking pressure calculation unit configured to calculate an ABS braking pressure of the right side wheel from the calculated feedforward braking pressure of the right side wheel, a target slip rate, and a current slip rate of the right side wheel.

16. The integrated control system for the vehicle of claim 13, wherein the feedforward braking pressure of the corresponding wheel is determined as the driver braking pressure when the limit braking pressure for each wheel is greater than the driver braking pressure, and the feedforward braking pressure of the corresponding wheel is determined as the limit braking pressure when the limit braking pressure for each wheel is equal to or less than the driver braking pressure.

17. The integrated control system for the vehicle of claim 1, wherein the rear wheel steering control amount calculation unit is configured to:
- calculate a yaw moment ($\Delta M_z$) caused by an asymmetric braking pressure in a braking situation where the friction coefficient of the left side road surface and the right side road surface are different from each other; and
- calculate a rear wheel steering control amount from the calculated yaw moment ($\Delta M_z$), using the ABS braking pressure of each vehicle wheel calculated by the ABS braking pressure calculation unit.

* * * * *